(12) United States Patent
Mikhailov et al.

(10) Patent No.: US 10,893,758 B2
(45) Date of Patent: Jan. 19, 2021

(54) SHELVING SYSTEM USING SHUTTERS

(71) Applicant: SIGNIFI SOLUTIONS INC., Mississauga (CA)

(72) Inventors: Serguei Mikhailov, Mississauga (CA); Yong Suk Jin, Oakville (CA); Shamira Jaffer, Mississauga (CA)

(73) Assignee: SIGNIFI SOLUTIONS INC., Mississauga (CA)

( * ) Notice: Subject to any disclaimer, the term of this patent is extended or adjusted under 35 U.S.C. 154(b) by 58 days.

(21) Appl. No.: 16/167,664

(22) Filed: Oct. 23, 2018

(65) Prior Publication Data
US 2019/0116992 A1 Apr. 25, 2019

Related U.S. Application Data

(60) Provisional application No. 62/575,741, filed on Oct. 23, 2017.

(51) Int. Cl.
| | | |
|---|---|---|
| *A47F 1/04* | (2006.01) |
| *A47F 5/00* | (2006.01) |
| *A47F 11/10* | (2006.01) |
| *G05B 19/418* | (2006.01) |
| *B65G 1/137* | (2006.01) |
| *A47F 3/00* | (2006.01) |
| *G06Q 10/08* | (2012.01) |

(52) U.S. Cl.
CPC ............... *A47F 1/04* (2013.01); *A47F 3/002* (2013.01); *A47F 5/005* (2013.01); *B65G 1/137* (2013.01); *G05B 19/41815* (2013.01); *A47F 11/10* (2013.01); *G05B 2219/40154* (2013.01); *G06Q 10/087* (2013.01)

(58) Field of Classification Search
CPC .. A47F 1/04; A47F 5/005; A47F 3/002; A47F 11/10; B65G 1/137; G05B 19/41815; G05B 2219/40154; G06Q 10/087
USPC .................................................. 700/213–244
See application file for complete search history.

(56) References Cited

U.S. PATENT DOCUMENTS

| | | | | |
|---|---|---|---|---|
| 2,827,118 A | * | 3/1958 | Wendt | F25D 23/021 160/184 |
| 3,851,764 A | * | 12/1974 | Anders | A47B 63/067 211/1.56 |
| 6,450,598 B1 | * | 9/2002 | Hanel | A47B 49/002 160/117 |
| 6,848,491 B2 | | 2/2005 | Gambarelli et al. | |
| 6,994,409 B2 | * | 2/2006 | Godlewski | A47B 63/06 312/215 |
| 8,123,071 B2 | * | 2/2012 | Fitzgerald | B65G 1/04 221/124 |
| 8,714,669 B1 | * | 5/2014 | Clausen | A47B 49/004 312/305 |
| 9,208,635 B2 | | 12/2015 | Fitzgerald et al. | |
| 9,478,093 B2 | * | 10/2016 | Broom | G07F 11/62 |

(Continued)

*Primary Examiner* — Michael Collins
(74) *Attorney, Agent, or Firm* — Perry + Currier Inc.

(57) ABSTRACT

A shelving system includes a dispensing module including a shutter and a track. The shutter is movable on the track. The shutter is associated with a motor, a connecting mechanism to control connection of the shutter and the motor, and a controller to control location of the shutter using the motor. The system further includes a control module including a user interface device and a control device to communicate with the dispensing module for dispensing an item.

13 Claims, 24 Drawing Sheets

(56) References Cited

U.S. PATENT DOCUMENTS

| | | |
|---|---|---|
| 10,559,158 B2* | 2/2020 | Broom .................... G07F 11/62 |
| 10,624,484 B1* | 4/2020 | Mountford ........... A47B 57/583 |
| 2002/0130135 A1* | 9/2002 | Fitzgerald ................. G07F 5/26 |
| | | 221/92 |
| 2014/0091684 A1* | 4/2014 | Fitzgerald ........... E05D 15/0621 |
| | | 312/35 |

* cited by examiner

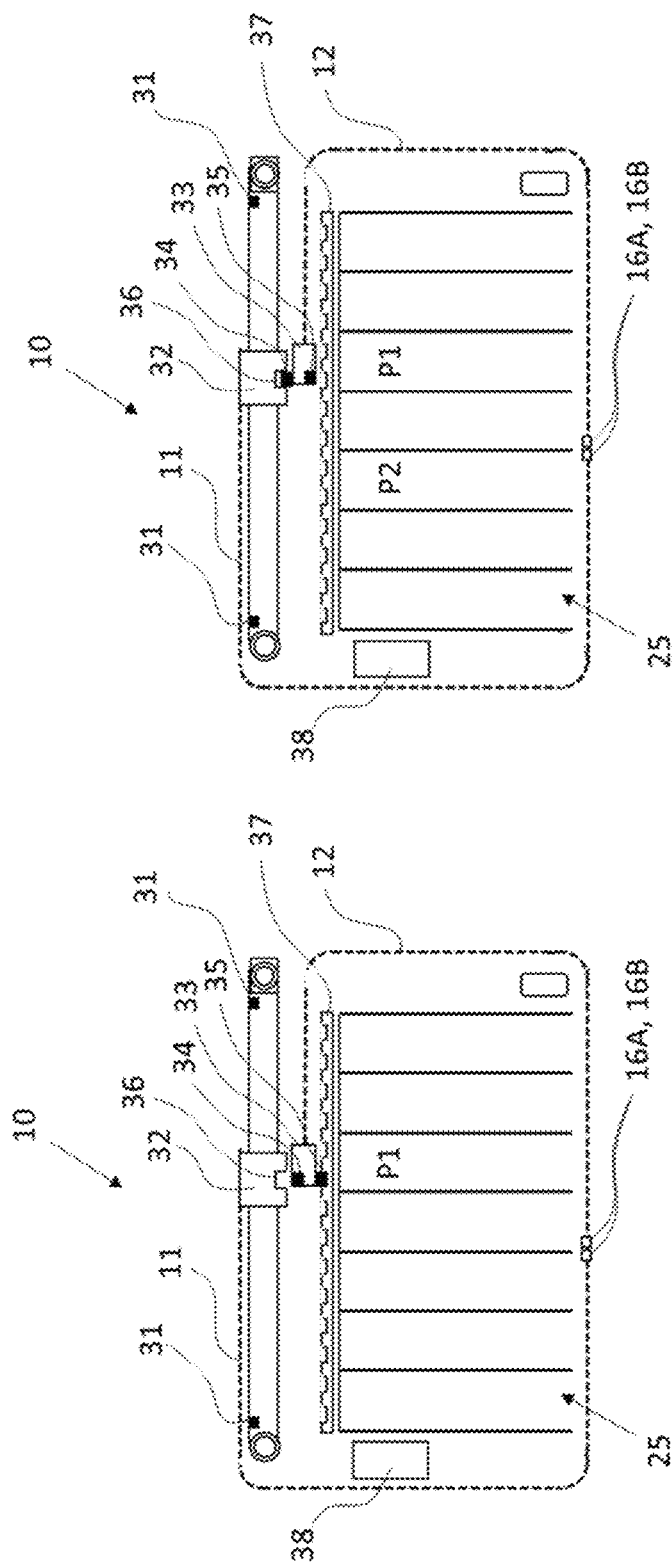

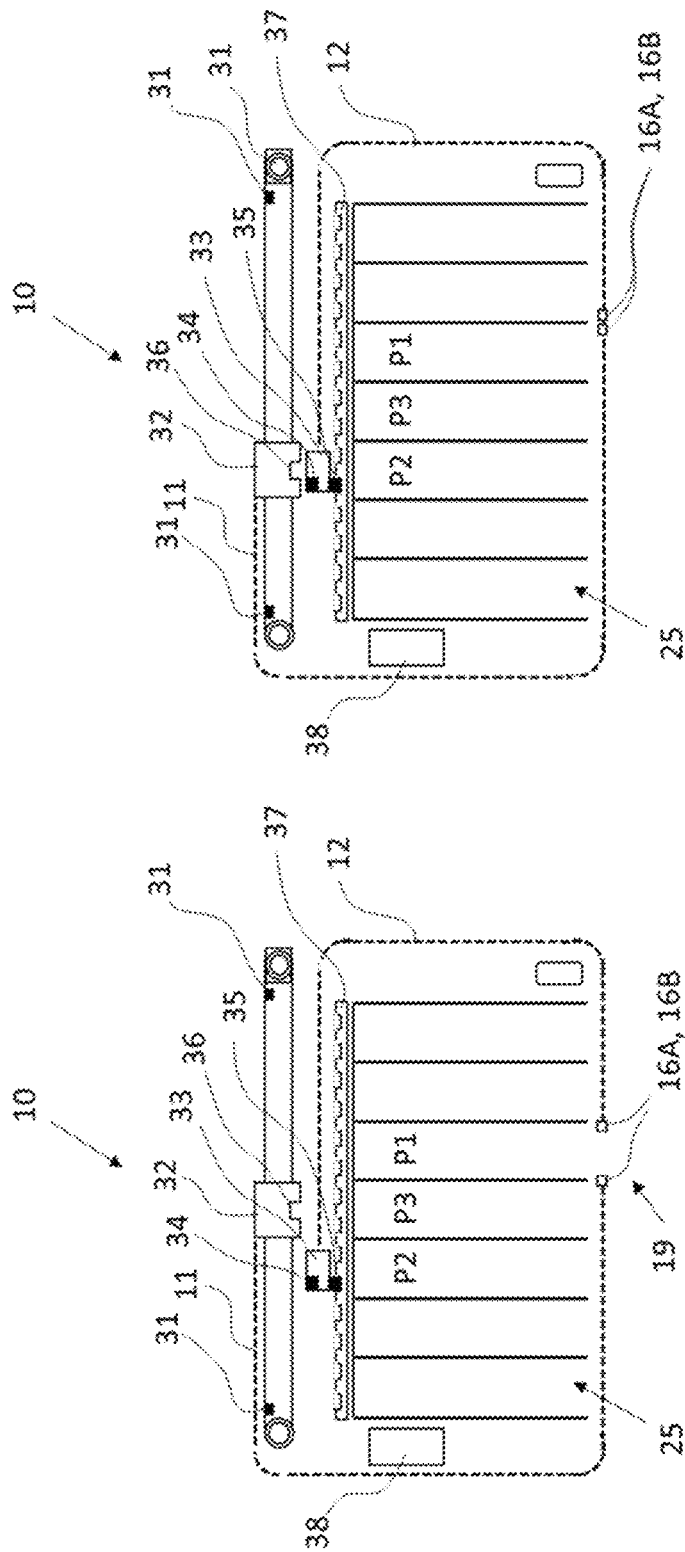

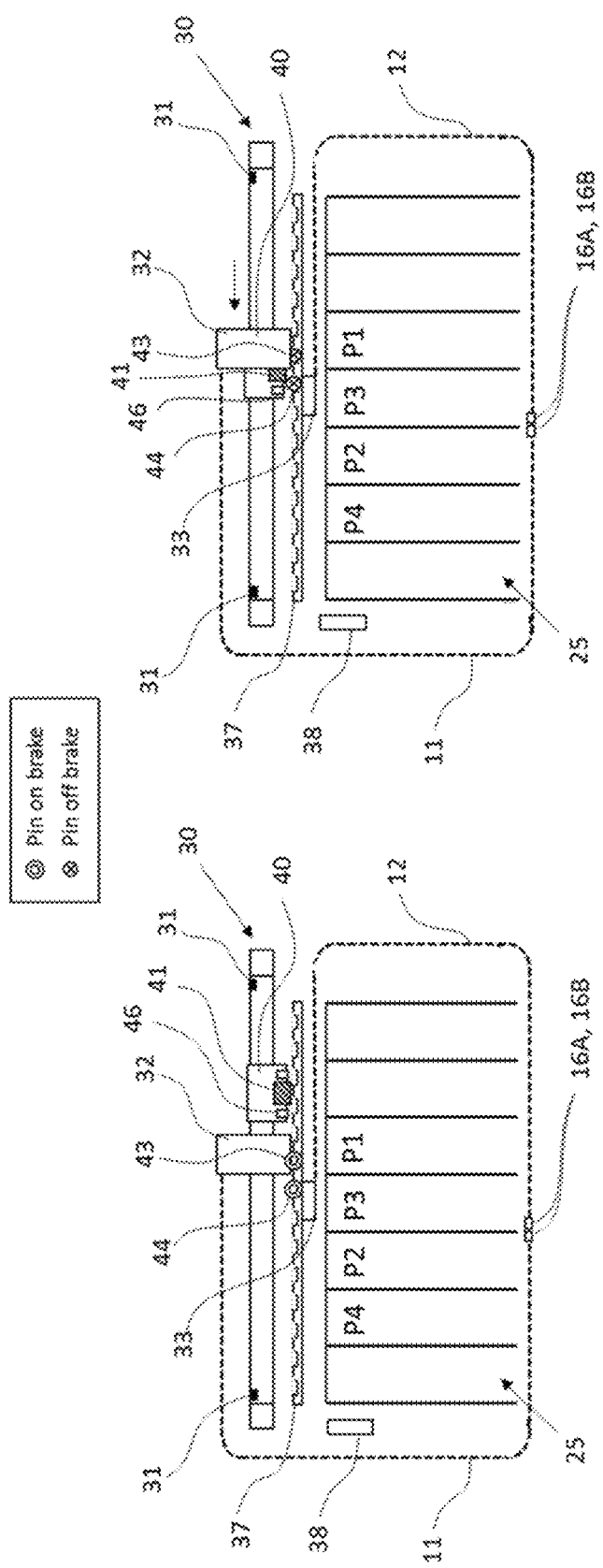

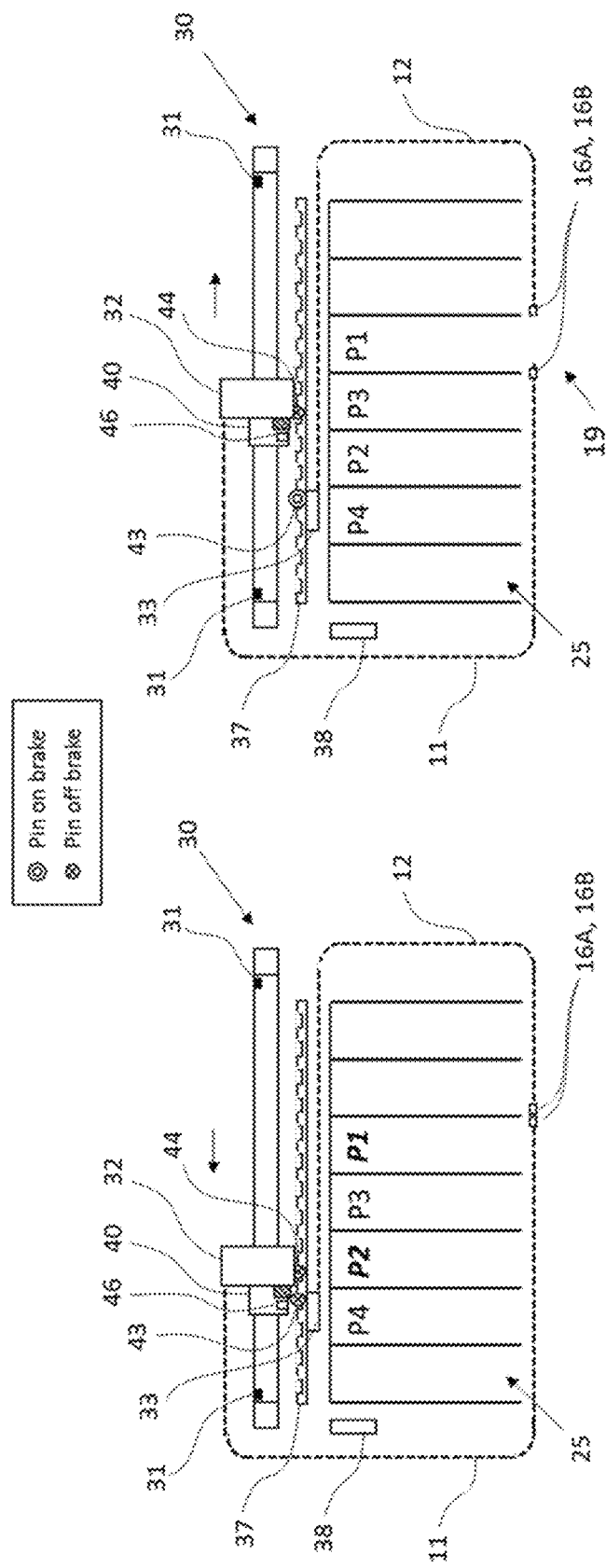

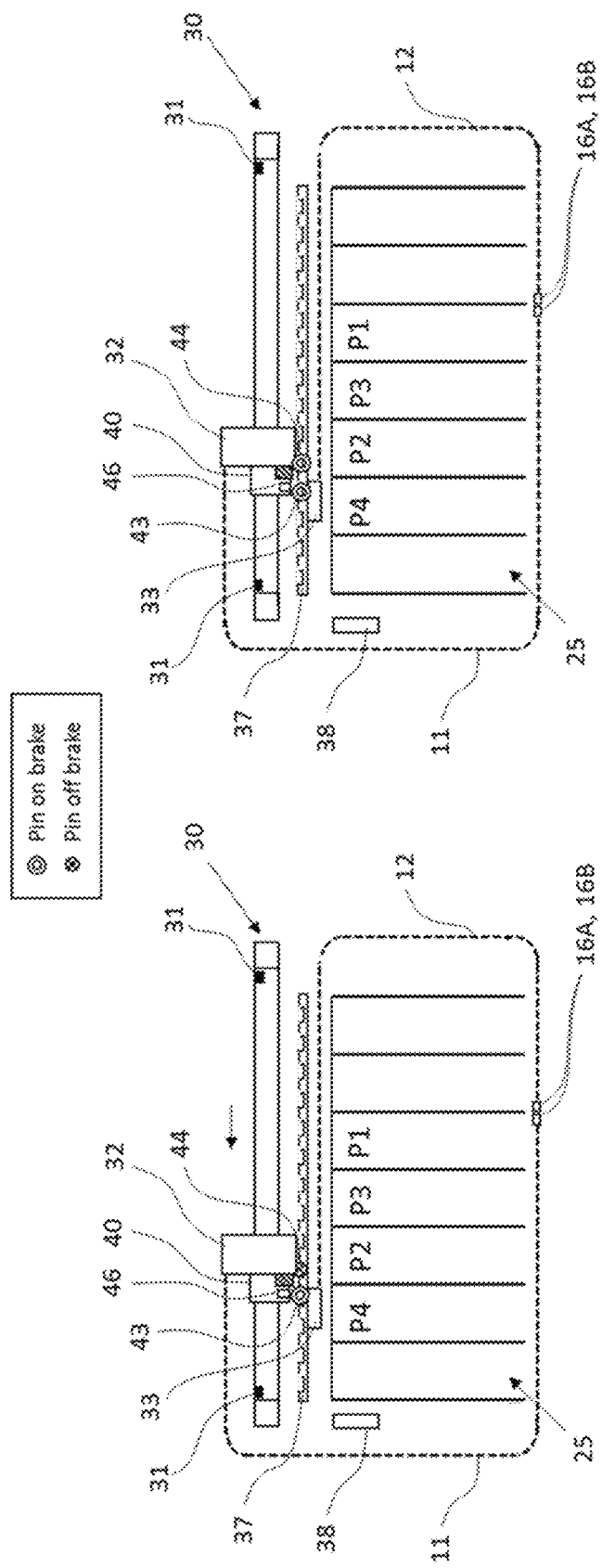

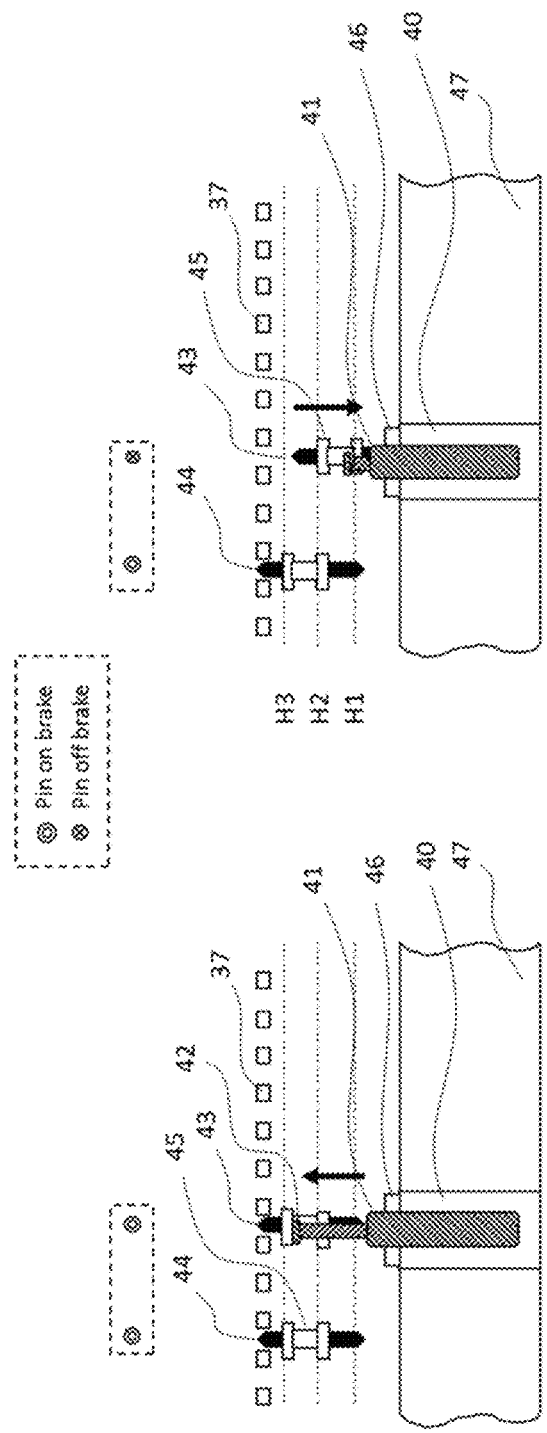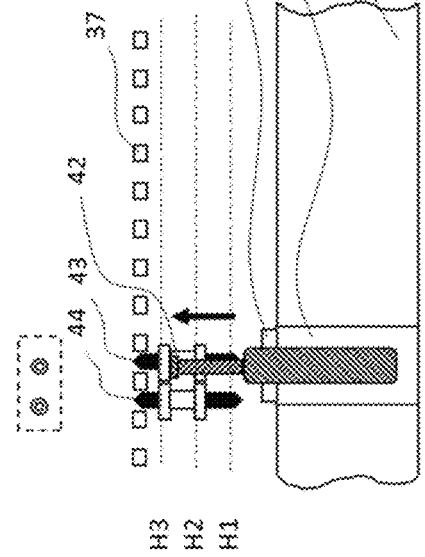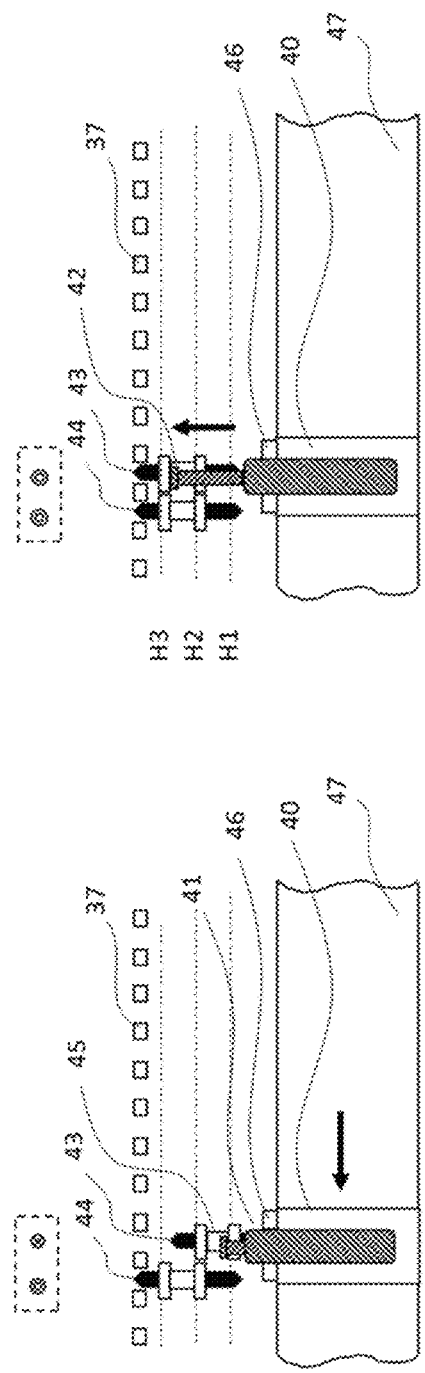

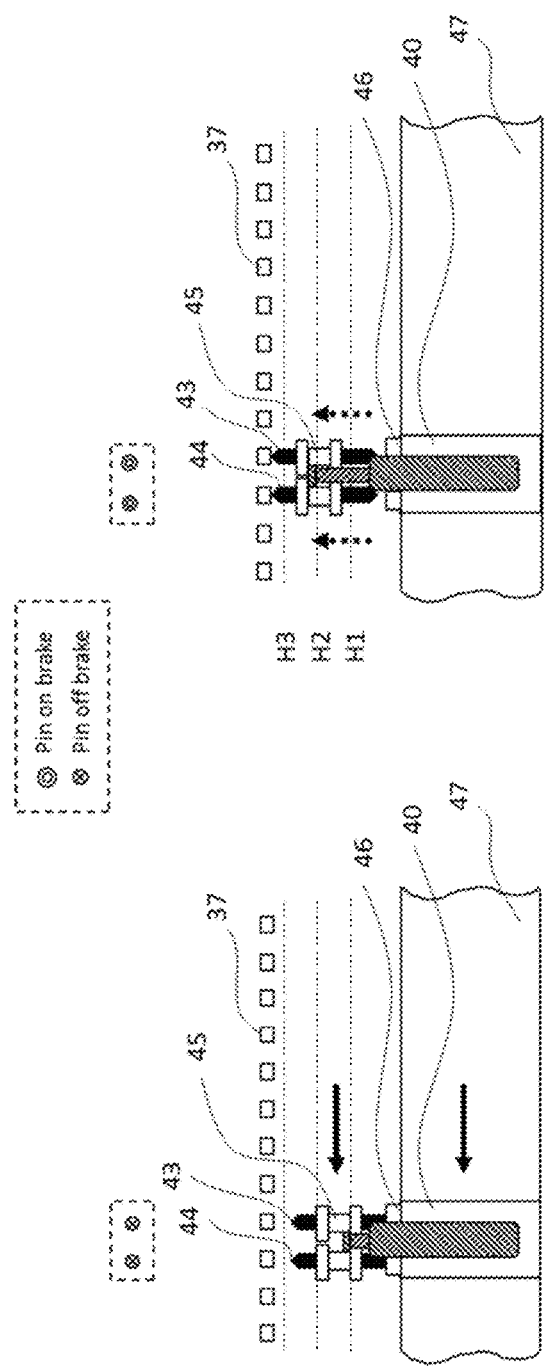
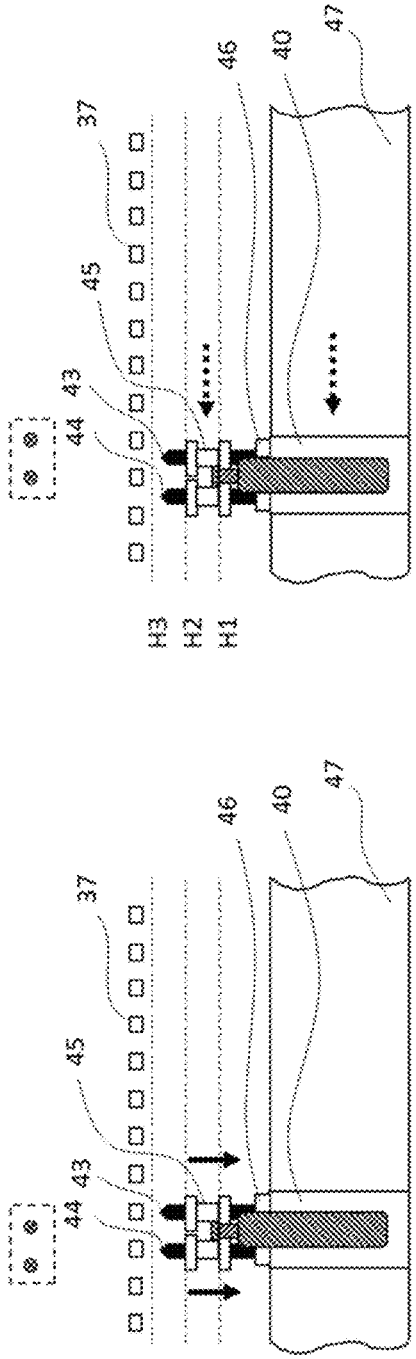
FIG. 30A
FIG. 30B
FIG. 30C
FIG. 30D

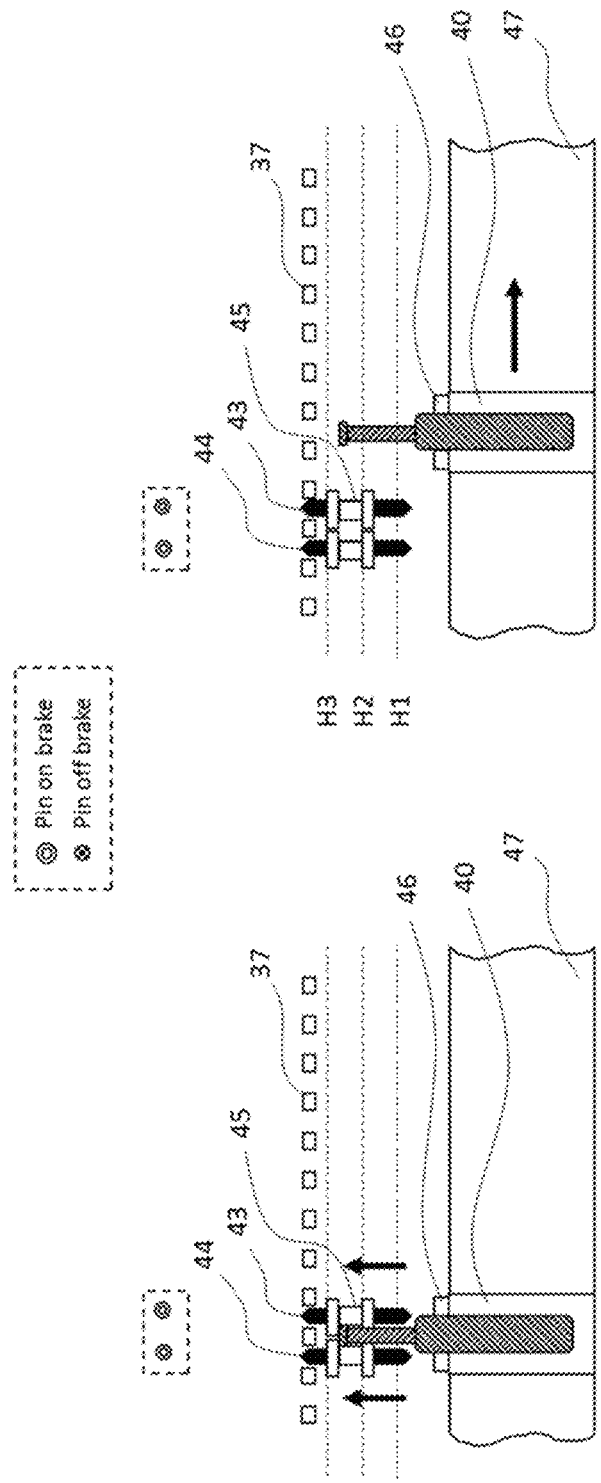

SHELVING SYSTEM USING SHUTTERS

CROSS-REFERENCE TO RELATED PATENT APPLICATIONS

This application claims priority to U.S. Provisional Patent Application No. 62/575,741, filed Oct. 23, 2017, which is incorporated herein by reference.

FIELD OF THE INVENTION

The present invention is in the technical field of shelving systems.

BACKGROUND OF THE INVENTION

According to the 2015 Global Retail Theft Barometer (GRTB), businesses lost around $123.4 billion to retail theft, almost 1.23% of overall retail sales globally, making retail theft one of the biggest problems facing retailers today. There are four main reasons for retail loss, which is otherwise known as shrinkage. Employee theft and shoplifting consist of 39% and 38% of the reasons respectively. These reasons account for more than 75% of shrinkage. Administration problems (16%) and supplier fraud (7%) are other reasons. The most stolen merchandise are footwear, batteries, mobile devices and accessories, and razor blades. There are needs to prevent shoplifting effectively.

The majority of shoplifters steal in response to an impulse. The National Association for Shoplifting Prevention (NASP) conducted a survey in the last five years which found that around 73% of shoplifting incidents are not premeditated. With proper deterrents in place, shoplifters are much less likely to actually act on their impulses. The most easily stolen items can be arranged in the high-traffic/public areas or be stocked using loss prevention shelving.

However, according to the NASP's statistics, approximately 3% of shoplifters are professionals who steal solely for resale or profit as a business. These include drug addicts who steal to feed their habit, hardened professionals who steal as a life-style, and international shoplifting gangs who steal for profit as a business. The professional shoplifters are responsible for 10% of the total monetary losses.

Shelving systems such as an Anti-Theft Hook (U.S. Pat. No. D668,937) and Loss Prevention Merchandiser (U.S. Pat. No. 8,657,154) are simple and cheap. These kinds of solutions deter some shoppers from shoplifting but cannot always prevent theft effectively. Such solutions often inconvenience customers. In other known solutions, a modular dispenser for product packages is equipped with a motor and solenoid device to guard against shoplifters (U.S. Pat. No. 8,788,091). A compact vending machine (U.S. Pat. No. 9,336,545) can dispense items but is small and requires specialized shelving structures.

SUMMARY OF THE INVENTION

According to an aspect of the invention, a shelving system includes at least one dispensing module including at least one shutter and at least one track. The at least one shutter is movable on the at least one track. The at least one shutter is associated with at least one motor, at least one connecting mechanism to control connection of the at least one shutter and the at least one motor, and at least one controller to control location of the at least one shutter using the at least one motor. The system further includes at least one control module including at least one user interface device and at least one control device. The at least one control module communicates with the at least one dispensing module for dispensing an item properly.

According to an aspect of the invention, a method for dispensing an item from a shelving system includes receiving a dispensing request indicating an item to be dispensed, sending a command to a motor controller indicating a location of an item to be delivered, preparing to move at least one shutter of at least two shutters that are connected each other using at least one connecting mechanism, moving the at least one shutter of the at least two shutters using at least one motor, preparing to move at least one shutter of the at least two shutters when disconnected from each other using at the least one connecting mechanism, moving the at least one shutter of the at least two shutters using at least one motor to open an opening gate, identifying delivery of the item, moving the at least one shutter of the at least two shutters when the at least two shutters are disconnected from each other using at least one motor to close the opening gate after dispensing the item, and storing updated information of the item in a database.

BRIEF DESCRIPTION OF THE DRAWINGS

FIG. 9 is a top view of an inside structure of a dispensing module at a stop position, according to a non-limiting embodiment.

FIG. 10 is a top view of an inside structure of a dispensing module combining a first slider and a second slider, according to a non-limiting embodiment.

FIG. 13 is a top view of an inside structure of a dispensing module moving a first slider to open an opening gate, according to a non-limiting embodiment.

FIG. 14 is a top view of an inside structure of a dispensing module moving a first slider to close an opening gate, according to a non-limiting embodiment.

FIG. 23 is a top view of an inside structure of a dispensing module at a stop position, according to a non-limiting embodiment.

FIG. 24 is a top view of an inside structure of a dispensing module moving an actuator slider to combine with a first slider and a second slider, according to a non-limiting embodiment.

FIG. 25 is a top view of an inside structure of a dispensing module moving an actuator slider with a first slider and a second slider to designated locations, according to a non-limiting embodiment.

FIG. 26 is a top view of an inside structure of a dispensing module moving an actuator slider with a first slider as parking a second slider to open an opening gate, according to a non-limiting embodiment.

FIG. 27 is a top view of an inside structure of a dispensing module moving an actuator slider with a first slider to close an opening gate, according to a non-limiting embodiment.

FIG. 28 is a top view of an inside structure of a dispensing module disconnecting an actuator slider from a first slider to place at a stop position, according to a non-limiting embodiment.

FIG. 29I is a front view of a moving step between pins, an actuator and an actuator slider moving up a first pin with an actuator, according to a non-limiting embodiment.

FIG. 29J is a front view of a moving step between pins, an actuator and an actuator slider moving down a first pin with an actuator, according to a non-limiting embodiment.

FIG. 29K is a front view of a moving step between pins, an actuator and an actuator slider moving an actuator slider with a first pin near to second pin, according to a non-limiting embodiment.

FIG. 29L is a front view of a moving step between pins, an actuator and an actuator slider moving up a first pin with an actuator, according to a non-limiting embodiment.

FIG. 30A is a front view of an adjusting step between pins, an actuator and an actuator slider moving an actuator slider with pins, according to a non-limiting embodiment.

FIG. 30B is a front view of an adjusting step between pins, an actuator and an actuator slider moving up pins with an actuator at an improper position, according to a non-limiting embodiment.

FIG. 30C is a front view of an adjusting step between pins, an actuator and an actuator slider moving down pins with an actuator, according to a non-limiting embodiment.

FIG. 30D is a front view of an adjusting step between pins, an actuator and an actuator slider moving an actuator slider with pins to find a proper location, according to a non-limiting embodiment.

FIG. 30E is a front view of an adjusting step between pins, an actuator and an actuator slider moving up pins with an actuator at a proper position, according to a non-limiting embodiment.

FIG. 30F is a front view of an adjusting step between pins, an actuator and an actuator slider moving an actuator slider to disconnect pins at a stop position, according to a non-limiting embodiment.

DETAILED DESCRIPTION OF THE INVENTION

The exemplary embodiments described herein provide a shelving system using shutters by control technologies and devices. Various configurations of the shelving system may be produced to suit various purposes.

Figure 1:
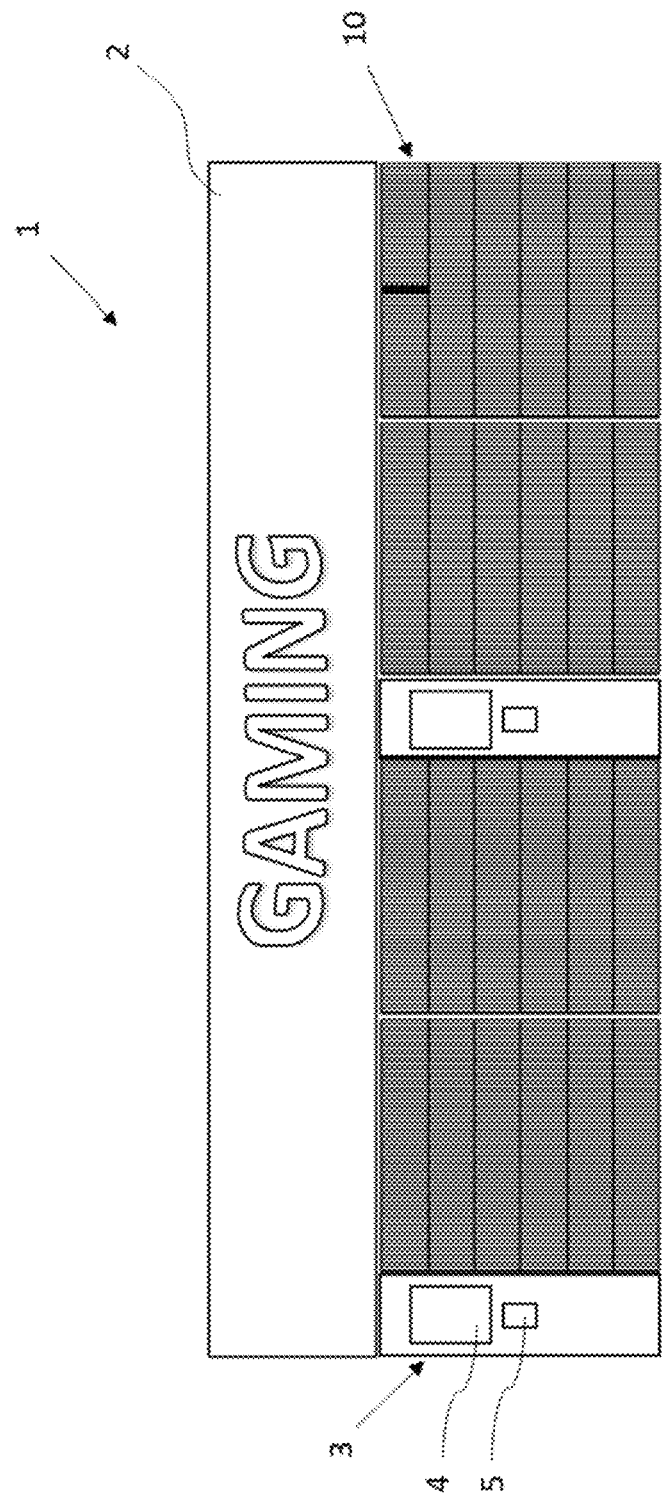
FIG. 1 is a front view of a shelving system, according to a non-limiting embodiment.

Referring to FIG. 1, a shelving system 1 is shown, according to a non-limiting embodiment. The shelving system 1 can include a display module 2, a control module 3 and a dispensing module 10. The display module 2, the control module 3, and the dispensing module 10 can be interconnected to operate the shelving system 1. According to the configuration of the shelving system 1, the display module 2, the control module 3, or dispensing module 10 can be combined or separated from each other.

The display module 2 can contain signboards or digital signage to show information about products, advertisements or guidance. The digital signage can include information display devices such as light emitting diodes (LEDs), liquid crystal displays (LCDs), organic light-emitting diodes (OLEDs), or projectors.

The control module 3 can include a user interface device 4 and payment and identification unit 5. The user interface device 4 can comprise a touch screen, a camera, a speaker, or similar. The payment and identification unit 5 can include conventional devices such as a card reader, a keypad, and a printer or digital devices such as blockchain applications or biometric devices.

The control module 3 can include a computing system having one or more processors, memories, and communication devices for facilitating its operation and for interfacing with other components of the shelving system 1. The control module 3 can communicate with internal devices such as receiving inputs from the user interface device 4 and sending commands to a motor controller 38. The control module 3 can communicate with external systems, such as network systems, over one or more computer networks, which can include the internet, a Wi-Fi network, a local-area network (LAN), a wide-area network (WAN), a virtual private network (VPN), a combination of such, and similar.

Figure 2:
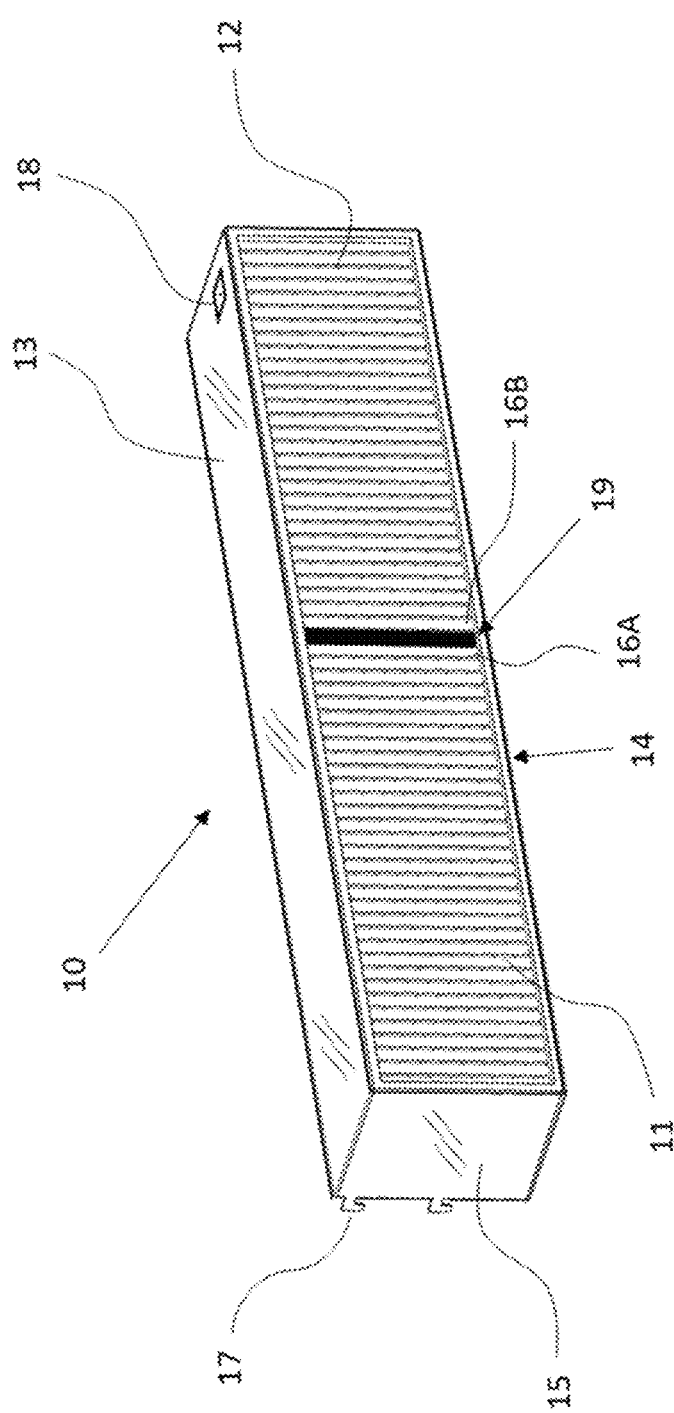
FIG. 2 is a perspective view of a dispensing module, according to a non-limiting embodiment.

FIG. 2 shows a perspective view of the dispensing module 10, according to a non-limiting embodiment. The dispensing module 10 comprises a first shutter 11, a second shutter 12, a top plate 13, a bottom plate 14, side plates 15, and shutter ends 16A, 16B. The space between shutter ends 16A, 16B defines an opening gate 19. The first shutter 11 and the second shutter 12 provide a structure similar to a tambour door to control opening width. The dispensing module 10 can include hook structures 17 or a through-hole 18. The hook structure 17 can allow the dispensing module 10 to be attached to conventional racks. The through-hole 18 accommodate wiring to connect each dispensing module 10 when stacking more than one dispensing module 10. The dispensing module 10 is extendable by connecting other dispensing modules 10.

In some embodiments, the first shutter 11 and the second shutter 12 are opaque, translucent, or transparent. Translucent or transparent shutters can make items visible from outside of the dispensing module 10. The materials of the first shutter 11 and the second shutter 12 may be plastic such as PVC or ABS or metal such as aluminum or stainless steel.

In some embodiments, the dispensing module 10 can include sensors or cameras to detect the location of an item or to check the inventory of the item.

In some embodiments, the dispensing module 10 can include lighting devices, such as LEDs, to illuminate the inside or outside of the dispensing module 10.

Figure 5:
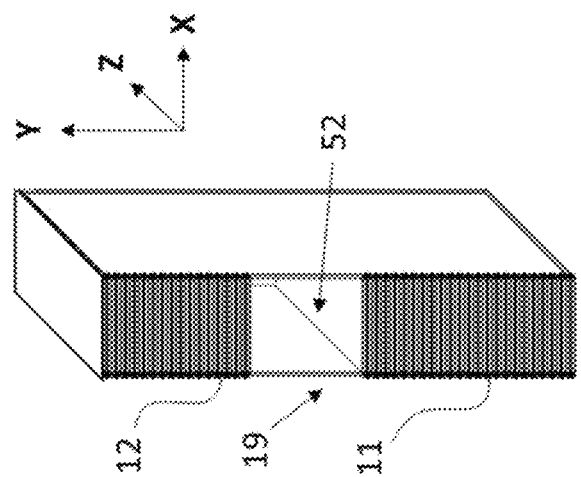
FIG. 5 is a perspective view of a structure of a dispensing module with adjustable height, according to a non-limiting embodiment.
Figure 4:
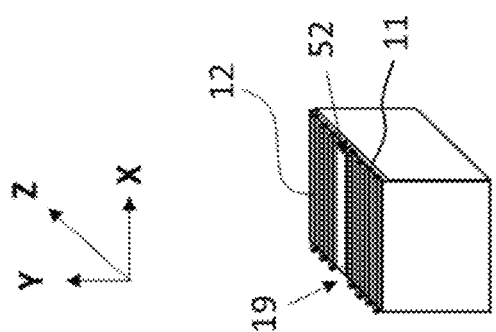
FIG. 4 is a perspective view of a structure of a dispensing module with adjustable depth, according to a non-limiting embodiment.
Figure 3:
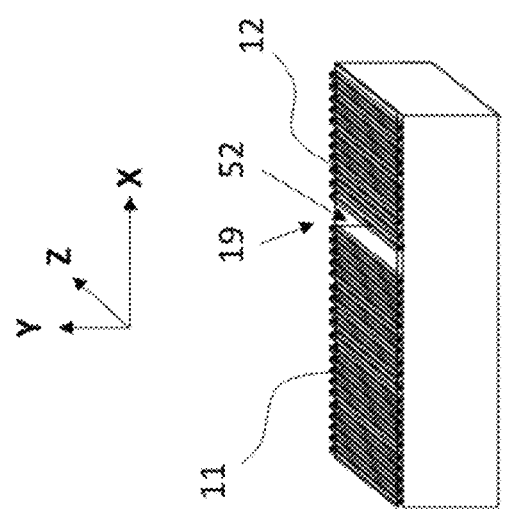
FIG. 3 is a perspective view of a structure of a dispensing module with adjustable width, according to a non-limiting embodiment.

FIGS. 3 to 5 show alternative configurations of the dispensing module 10 with respect to the opening direction of the first shutter 11 and the second shutter 12.

FIG. 3 shows a perspective view of an alternative configuration of the dispensing module 10 as a horizontal door, according to a non-limiting embodiment. The first shutter 11 and the second shutter 12 move along an X axis to provide a horizontal opening gate 19. Therefore, the width of slots 25 in the horizontal door is variable and may be selected based on the items to be stored. Items such as DVDs, games, or razor blades can be dispensed effectively using the horizontal opening gate 19.

FIG. 4 shows a perspective view of an alternative configuration of the dispensing module 10 as a drawer, according to a non-limiting embodiment. The first shutter 11 and the second shutter 12 move along a Z axis to provide a drawer-style opening gate 19. Therefore, the depth of slots 25 in the drawer is variable and may be selected based on the items to be stored. The dispensing module 10 moves forward to open and backward to close. Items such as documents, contact lenses, or medications can be dispensed effectively using the drawer opening gate 19.

FIG. 5 shows a perspective view of an alternative configuration of the dispensing module 10 as a vertical locker, according to a non-limiting embodiment. The first shutter 11 and the second shutter 12 move along a Y axis to provide a vertical opening gate 19. Therefore, the height of slots 25 in the vertical locker is variable and may be selected based on the items to be stored. Items such as parcels or electronic devices can be dispensed effectively using the vertical opening gate 19.

In some embodiments, the dispensing module 10 can include functions of the display module 2 or the control module 3 as a standalone module. The dispensing module 10 as a standalone module can include customer recognizing devices such as Beagle Bluetooth trackers, smart speakers and cameras for computer vision system.

In various embodiments, the shelving system 1 can be used as an asset management system to dispense a company's tools or other assets, such as mobile devices and the like using, for example, the vertical opening gate 19.

Figure 7:
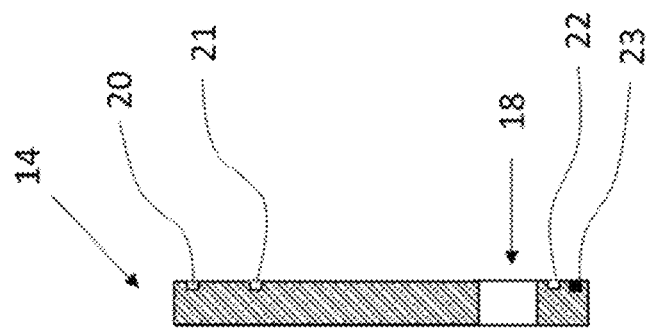
FIG. 7 is a cross sectional view of a bottom plate of a dispensing module at a line A-B in FIG. 6, according to a non-limiting embodiment.
Figure 6:
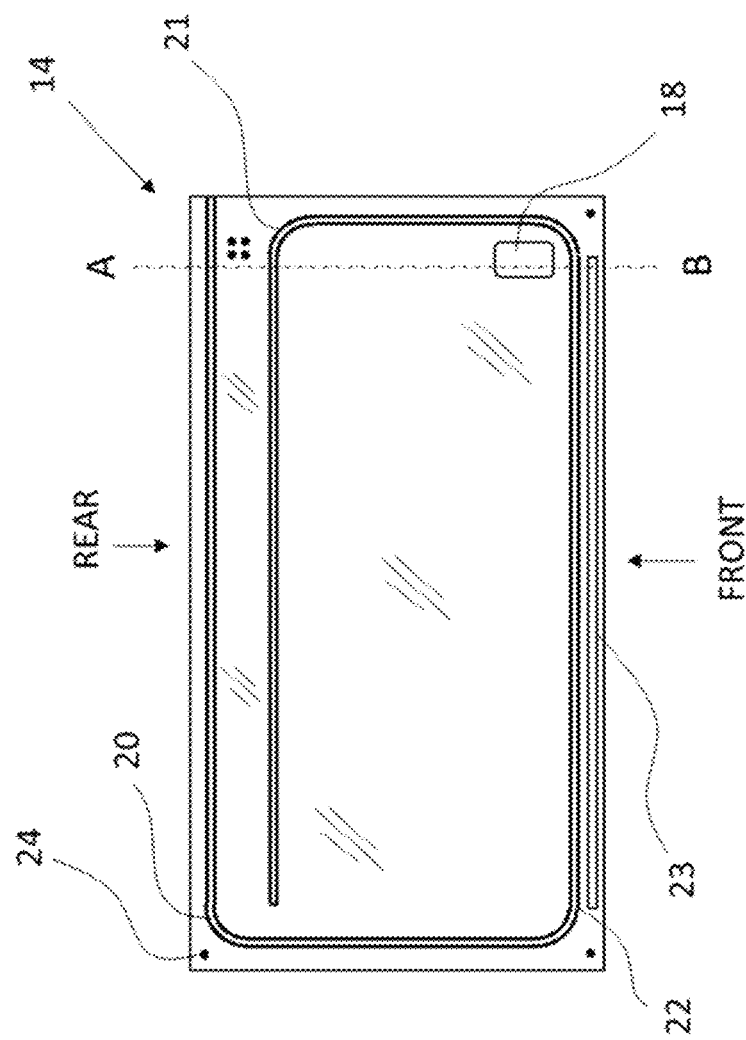
FIG. 6 is a top view of a bottom plate of a dispensing module, according to a non-limiting embodiment.

Referring to FIGS. 6 and 7, the bottom plate 14 is shown, according to a non-limiting embodiment. FIG. 6 shows the top view of the bottom plate 14 and FIG. 7 shows the cross-sectional view of the bottom plate 14 at a section line A-B in FIG. 6. The bottom plate 14 includes an outer track 20, an inner track 21, and a front track 22. The outer track 20 guides the first shutter 11 whereas the inner track 21 guides the second shutter 12. The front track 22 guides both the first shutter 11 and the second shutter 12. The shapes of the outer track 20, the inner track 21, and the front track 22 can be straight, round, curved, or flexible depending on the specific implementation of the dispensing module 10. The shape of the top plate 13 is substantially the same as that of the bottom plate 14. The top plate 13 and the bottom plate 14 can be combined through the assembly holes 24. The top plate 13 or the bottom plate 14 can include LED lighting 23, assembly holes 24, or through-hole 18.

In various embodiments, the top plate 13 or the bottom plate 14 can be made from plastic, wood, or metal. The outer track 20, the inner track 21, and the front track 22 are recessed on the top plate 13 and the bottom plate 14. The outer track 20, the inner track 21 and the front track 22 can be also mounted on the surface of the top plate 13 and the bottom plate 14.

In various embodiments, LED lighting 23 can be recessed on the top plate 13 or the bottom plate 14. LED lighting 23 can be mounted on the top plate 13 or the bottom plate 14. LED lighting 23 can include LED strips, lenses, and housings. LED lighting 23 can illuminate light of various colors such as white, red, green, or blue indicating specific locations to pick up items or specific statuses of the dispensing module 10.

Figure 8:
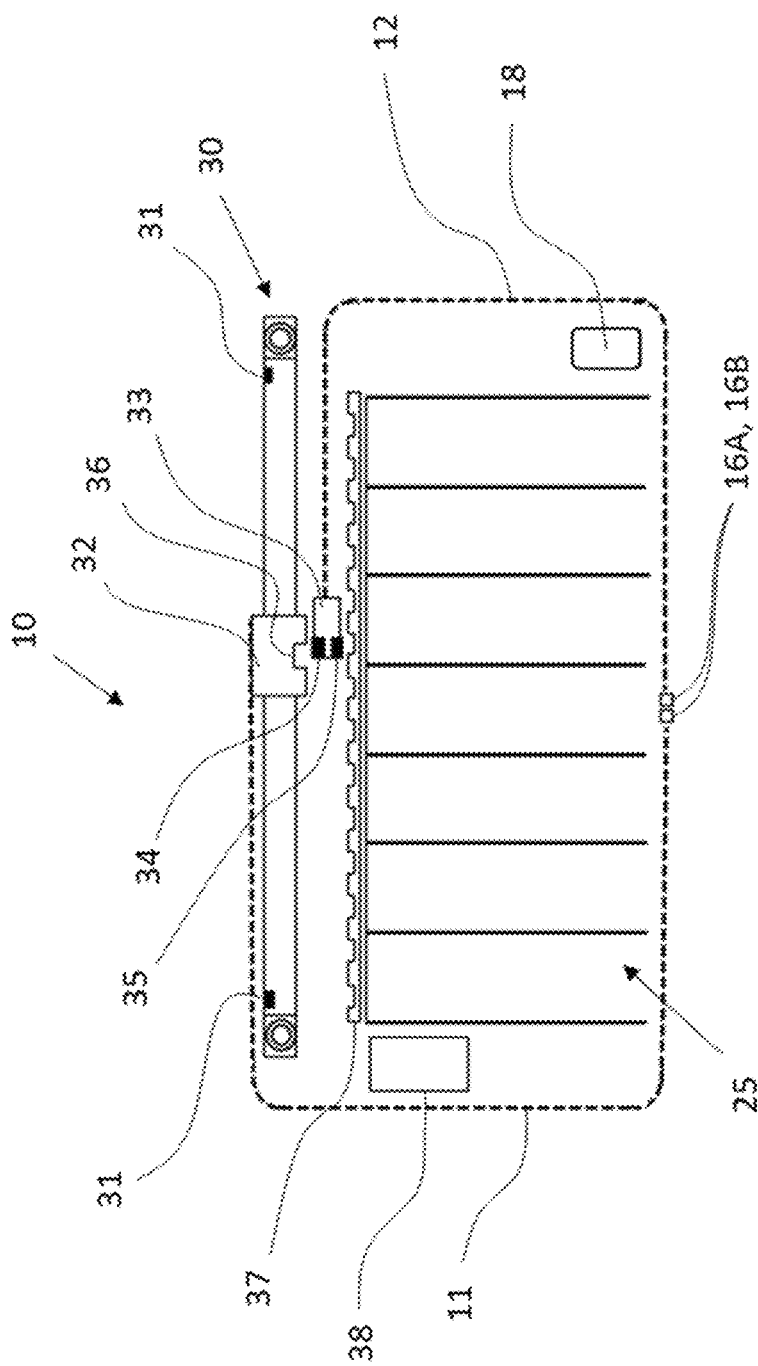
FIG. 8 is a top view of an inside structure of a dispensing module, according to a non-limiting embodiment.

Referring to FIG. 8, an inside structure of the dispensing module 10 is shown, according to a non-limiting embodiment. The dispensing module 10 includes the inside structure between the top plate 13 and the bottom plate 14. A linear drive 30 moves a first slider 32 and the first slider 32 moves the first shutter 11 connected with the first slider 32. The linear drive 30 includes a rotary motor or a linear motor to power it. The linear drive 30 can include a rail structure and location sensors 31 to set up home position of the first slider 32 precisely. The second slider 33 is attached to the second shutter 12. The second slider 33 moves in connection with a latch 36 of the first slider 32 whereas the second slider 33 parks in connection with a brake grid 37. The second slider 33 includes a latch solenoid switch 34 and a brake solenoid switch 35, which can control the connection with the first slider 32 and the brake grid 37 respectively. The linear drive 30 can include functions of a brake and an encoder which help to control the movement of the first slider 32. A motor controller 38 can control the movement of a motor associated with the control module 3. Therefore, the control module 3 can communicate with the motor controller 38 and database management system (not shown) to actuate movement of the first shutter 11 and the second shutter 12 to a specific location.

In various embodiments, the functions of the latch solenoid switch 34 and the brake solenoid switch 35 can be combined into one solenoid.

In various embodiments, the linear drive 30 can operate several dispensing modules connected with each other to control sequences among dispensing modules.

FIGS. 9 to 14 show moving steps of parts in the dispensing module 10, according to a non-limiting embodiment. An item can be delivered as a result of the moving steps of parts in the dispensing module 10.

FIG. 9 shows an inside structure of the dispensing module 10 at a stop position, according to a non-limiting embodiment. Shutter ends 16A, 16B meet securely at the stop position as the second slider 33 parks at the brake grid 37 around location P1. The first slider 32 remains apart from the second slider 33.

FIG. 10 shows an inside structure of the dispensing module 10 preparing to move both the first shutter 11 and the second shutter 12, according to a non-limiting embodiment. The brake solenoid switch 35 is released from the brake grid 37 and the latch solenoid switch 34 is connected to the latch 36 of the first slider 32 before moving the first slider 32 to location P2 (See also FIG. 15, step 104).

Figure 11:
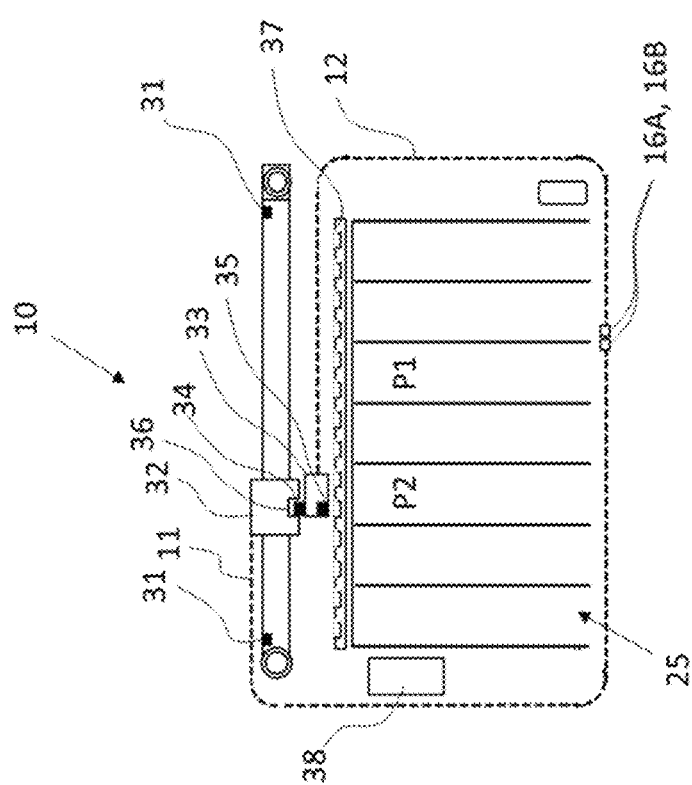
FIG. 11 is a top view of an inside structure of a dispensing module moving a first slider and a second slider to designated locations, according to a non-limiting embodiment.

FIG. 11 shows an inside structure of a dispensing module 10 moving the first shutter 11 and the second shutter 12 together to a designated location, according to a non-limiting embodiment. The first slider 32 and the second slider 33 move to location P2 as combined with each other. The shutter ends 16A, 16B also move associated with the first shutter 11 and the second shutter 12 (See also FIG. 15, step 106).

Figure 12:
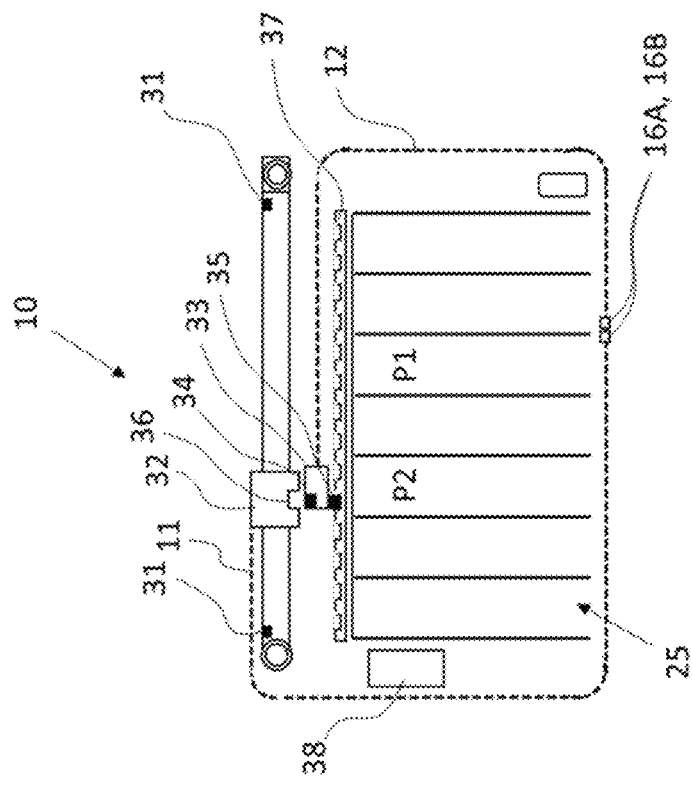
FIG. 12 is a top view of an inside structure of a dispensing module parking a second slider, according to a non-limiting embodiment.

FIG. 12 shows an inside structure of a dispensing module 10 parking the second slider 33 at the brake grid 37, according to a non-limiting embodiment. The second slider 33 is parked at the brake grid 37 using the brake solenoid switch 35 and the first slider 32 is released from the second slider 33 using the latch solenoid switch 34. The shutter ends 16A, 16B stay at the same location as FIG. 11 (See also FIG. 15, step 108).

FIG. 13 is a top view of an inside structure of a dispensing module 10 opening shutters, according to a non-limiting embodiment. The first slider 32 moves to location P3 to make the opening gate 19 retain the second slider 33 at location P2. A customer or an operator can pick up or stock an item through the opening gate 19. The opening gate 19 is aligned with slots 25 (See also FIG. 15, step 110).

FIG. 14 is a top view of an inside structure of a dispensing module 10 closing shutters, according to a non-limiting embodiment. The first slider 32 moves back to location P2 to close the opening gate 19 after accomplishing operations (See also FIG. 15, step 114).

Figure 15:
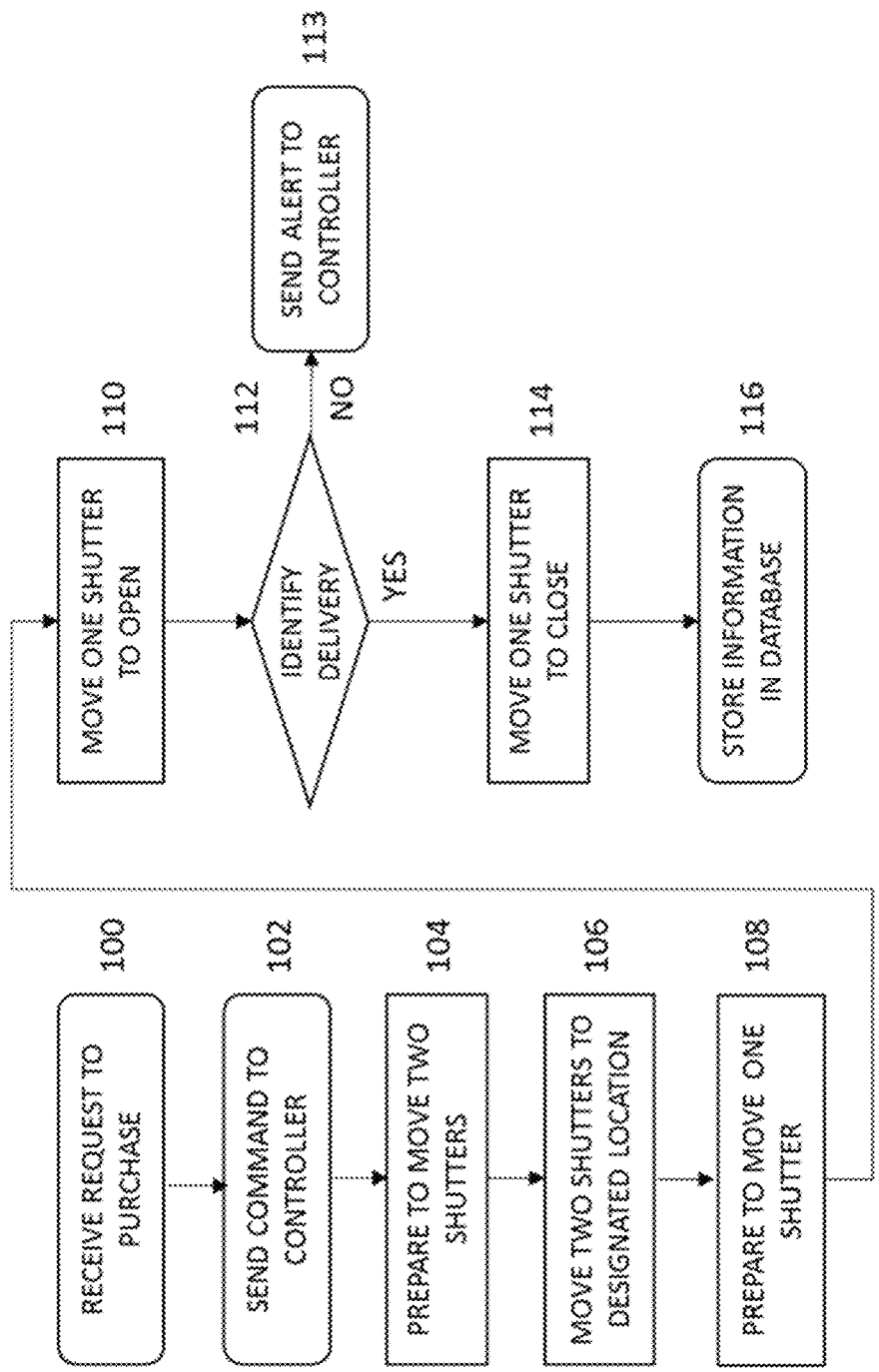
FIG. 15 is a flowchart illustrating a method of operating a shelving system for purchasing an item, according to a non-limiting embodiment.

FIG. 15 shows an example method of delivering an item, according to a non-limiting embodiment. It is emphasized that the steps need not be performed in the exact sequence as shown.

At step 100, a purchase request is received indicating an item to be delivered. In various embodiments, the purchase request from a customer can be received by the shelving system 1 through the control module 3.

At step 102, a command is sent to the motor controller 38 indicating the location of the item to be delivered. In various embodiments, the control module 3 of the shelving system 1 can send a command to the motor controller 38 based on the location information stored in the shelving system 1 or external systems associated with the shelving system 1.

At step 104, the control module 3 send a command to prepare to move the first shutter 11 and the second shutter 12. In various embodiments, the brake solenoid switch 35 is released from the brake grid 37 and the latch solenoid switch 34 is connected to the latch 36 of the first slider 32 before moving the first slider 32 and the second slider 33 to the designated location. Now the first shutter 11 and the second shutter 12 are connected to each other.

At step 106, the first shutter 11 and the second shutter 12 move to the designated location. In various embodiments, the first slider 32 combined with the second slider 33 moves to the designated location. The shutter ends 16A, 16B also move at the same time. LED lighting 23 can illuminate around the shutter ends 16A, 16B to prompt the location of the opening gate 19. LED lighting 23 can also scan a path from one certain point to the location of the opening gate 19 for easy pick up.

At step 108, the control module 3 send a command to prepare to move the first shutter 11. In various embodiments, the first slider 32 is released from the second slider 33 while the second slider 33 is parked at the brake grid 37. Now the first shutter 11 and the second shutter 12 are disconnected from each other.

At step 110, the first shutter 11 moves to open the opening gate 19. In various embodiments, the first shutter 11 moves to the reverse direction of step 106 making the opening gate 19 open while the second shutter 12 stays in place. The width of the opening gate 19 (i.e., how much space is provided for access) may be determined by the purchase request, which may contain data such as item width or item amount. The opening gate 19 is aligned with slots 25 using the motor and the motor controller 38. Now the opening gate 19 is open so a customer can pick up an item.

At step 112, sensors or cameras that may be located around the shelving system 1 may identify if the delivery of an item was successfully executed. If the delivery of an item was not performed properly, the motor controller 38 or sensors sends an alert to the control module 3 so that operators/managers can deal with a problem (See step 113). The shelving system 1 can alert a customer. For example, when an item remains after a predetermined length of time, the shelving system 1 can issue a customer a reminder such as a flashing LED light or changing LED light color or alerting sounds.

At step 114, the first shutter 11 moves to close the opening gate 19. In various embodiments, the first slider 32 moves to the reverse direction of step 110 making the opening gate 19 close while the second shutter 12 stays in place. Now the opening gate 19 is closed. If a force is applied to the dispensing module 10 to open the opening gate 19, the motor controller 38 or sensors can send alert to the control module 3 so that operators/managers can be informed.

At step 116, the shelving system 1 stores the information on the delivery of an item in a database. In various embodiments, the shelving system 1 stores the information on the delivery of an item and updates the location of items in a database. In addition to the location information, the database can contain information such as the operation log record, the item history, and similar for traceability and security.

Figure 16:
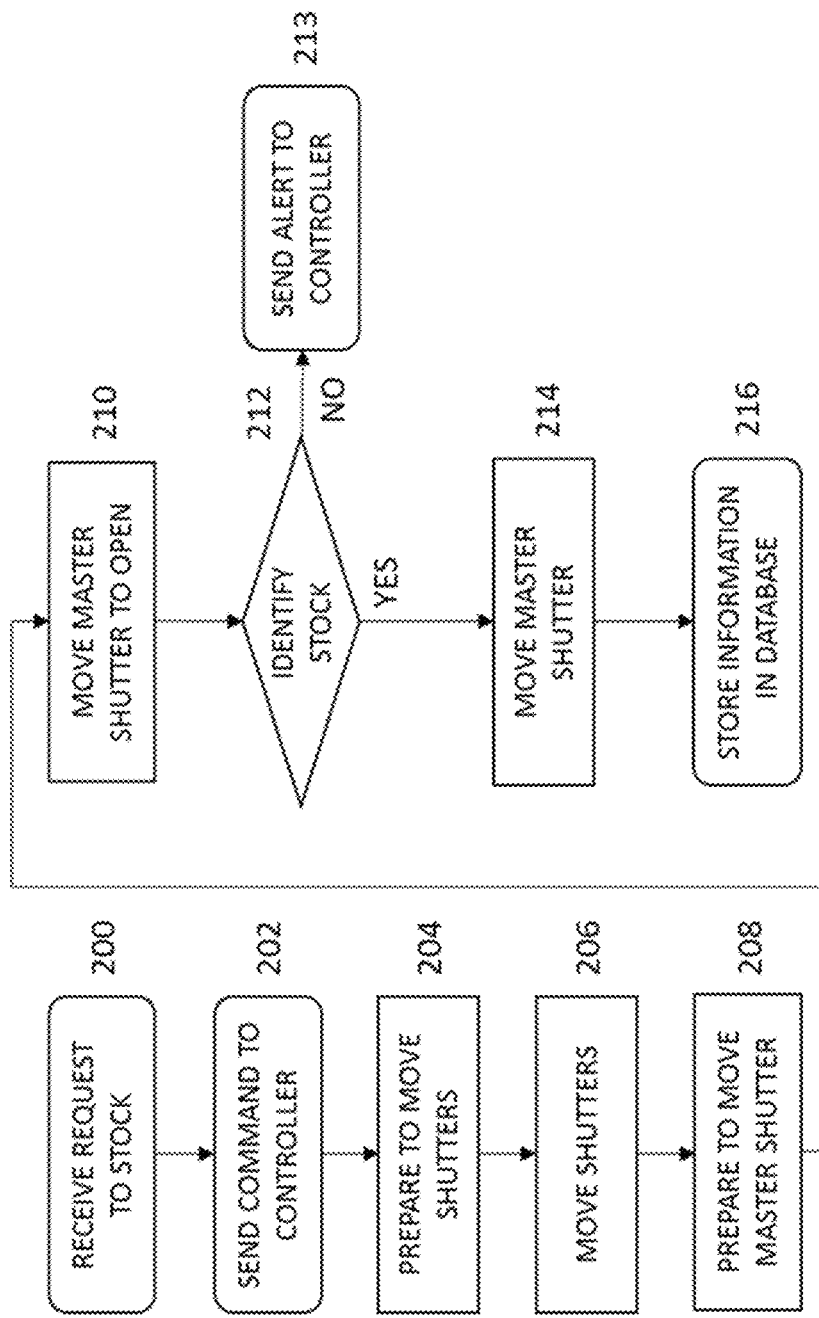
FIG. 16 is a flowchart illustrating a method of operating a shelving system for stocking an item, according to a non-limiting embodiment.

FIG. 16 shows an example method of stocking an item, according to a non-limiting embodiment. It is emphasized that the steps need not be performed in the exact sequence as shown.

At step 200, a stock request is received indicating an item to be stocked. In various embodiments, the stock request can be received by the shelving system 1 from an operator through the control module 3 to stock the item. An operator accesses the control module 3 and inputs identification to obtain authorization to access the shelving system 1. The operator inputs information of items to be stored using input devices such as a barcode scanner or RFID scanner or keypad. The operator can use a bulk stock mode which can allow the insertion of multiple items into the dispensing module 10 at once.

At step 202, a command is sent to the motor controller 38 indicating the location of the item to be stored. In various embodiments, the control module 3 of the shelving system 1 can send a command to the motor controller 38 based on the location information stored in the shelving system 1 or external systems associated with the shelving system 1.

Steps from 204 to 208 are the same as described in steps from 104 to 108. The first shutter 11 and the second shutter 12 move to the designated location. The first shutter 11 prepares to open the opening gate 19 thereafter.

At step 210, the first shutter 11 moves to make the opening gate 19 open. In various embodiments, the first shutter 11 moves to make the opening gate 19 open whereas the second shutter 12 stays in place. The width of the opening gate 19 may be determined based on the stock request, which may contain data such as item width or item amount. If a bulk stock mode was selected at step 200, the opening gate 19 extends to the left end and the right end of the dispensing module 10 to allow multiple items to be stocked at once. The opening gate 19 is aligned with slots 25 using the motor and the motor controller 38. Now the opening gate 19 is open so an operator can stock an item or items.

At step 212, sensors or cameras that may be located around the shelving system 1 may identify whether an item was successfully stocked. If an item was not successfully stocked, the motor controller 38 or sensors sends an alert to the control module 3 so that managers can deal with any potential problems (See step 213).

Steps 214 to 216 are the same as steps 114 to 116. The first shutter 11 moves to close the opening gate 19. The shelving system 1 stores the information on the stored item in a database.

FIGS. 17 to 22 show structures of a double deck dispensing module, according to a non-limiting embodiment.

Figure 17:
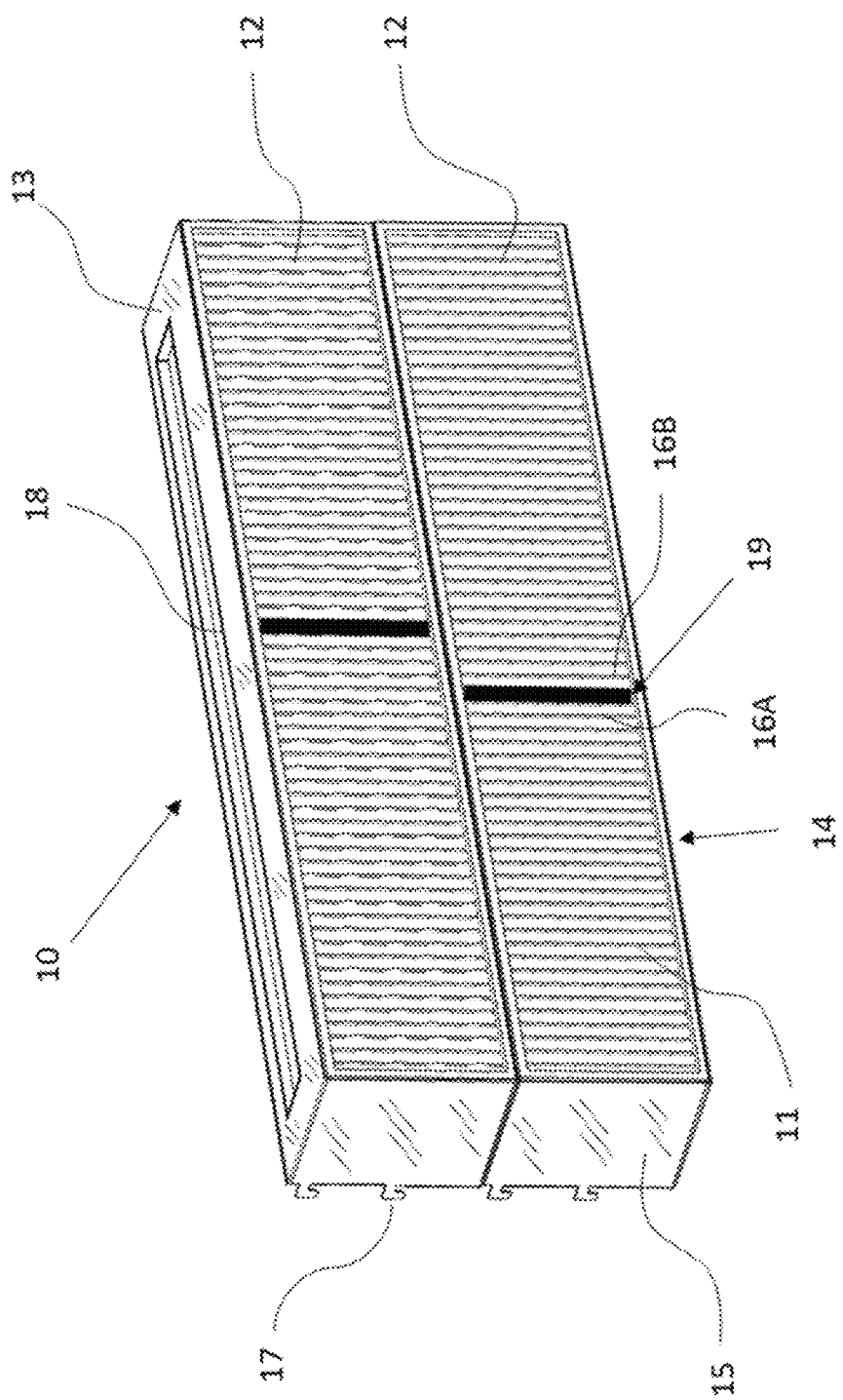
FIG. 17 is a perspective view of a double deck dispensing module, according to a non-limiting embodiment.

FIG. 17 shows a perspective view of the double deck dispensing module 10, according to a non-limiting embodiment. The double deck dispensing module 10 comprises first shutters 11, second shutters 12, top plates 13, bottom plates 14, side plates 15, and shutter ends 16A, 16B. The space between shutter ends 16A, 16B defines opening gates 19 as explained in FIG. 2.

Figure 18:
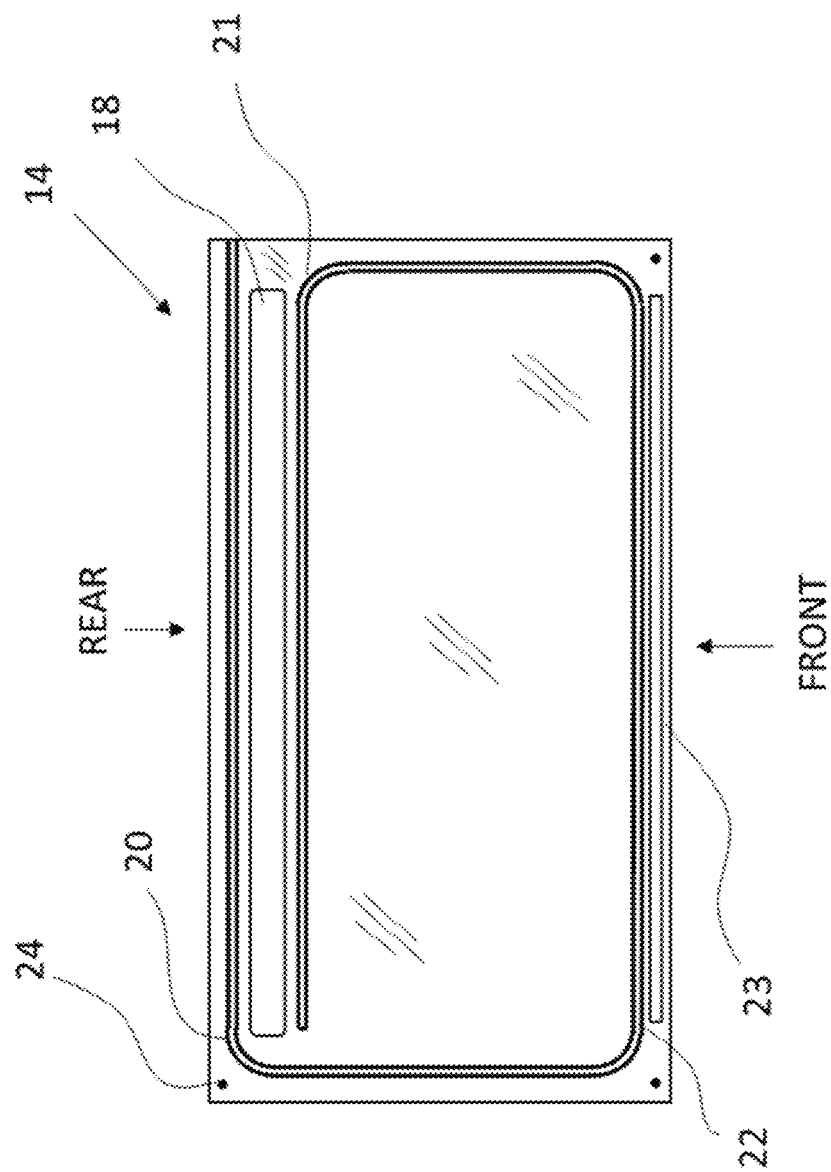
FIG. 18 is a top view of a bottom plate of a double deck dispensing module, according to a non-limiting embodiment.

FIG. 18 shows a top view of a bottom plate of a double deck dispensing module, according to a non-limiting embodiment. The bottom plate 14 includes an outer track 20, an inner track 21, and a front track 22 as explained in FIG. 6.

Referring to FIGS. 19 to 22, inside structures of a double deck dispensing module 10 are shown, according to a non-limiting embodiment. In this embodiment, a connecting mechanism is powered by a linear drive 30 and linear actuator 41. The connecting mechanism is not limited to the structure of the double deck dispending module 10.

Figure 19:
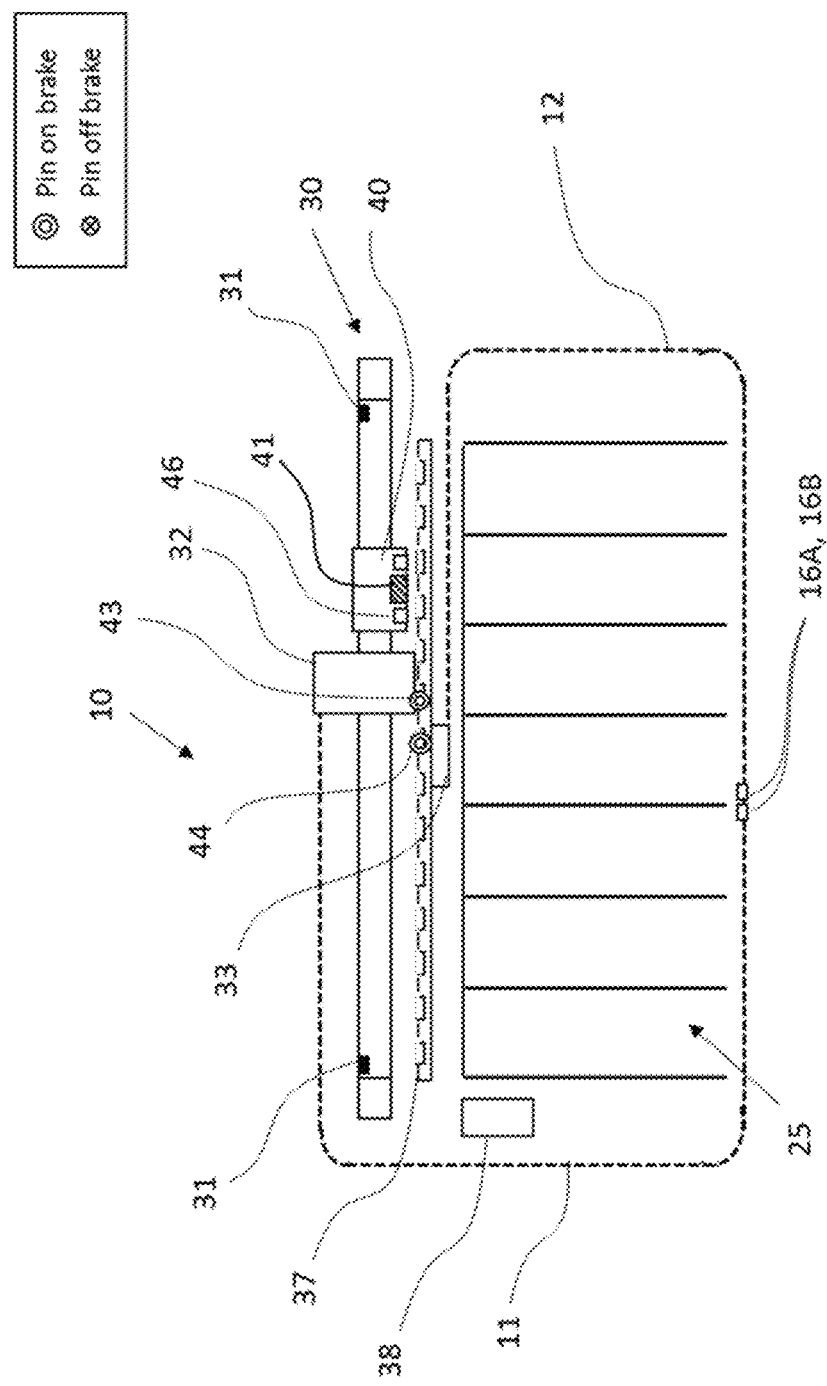
FIG. 19 is a top view of an inside structure of a double deck dispensing module, according to a non-limiting embodiment.
Figure 20:
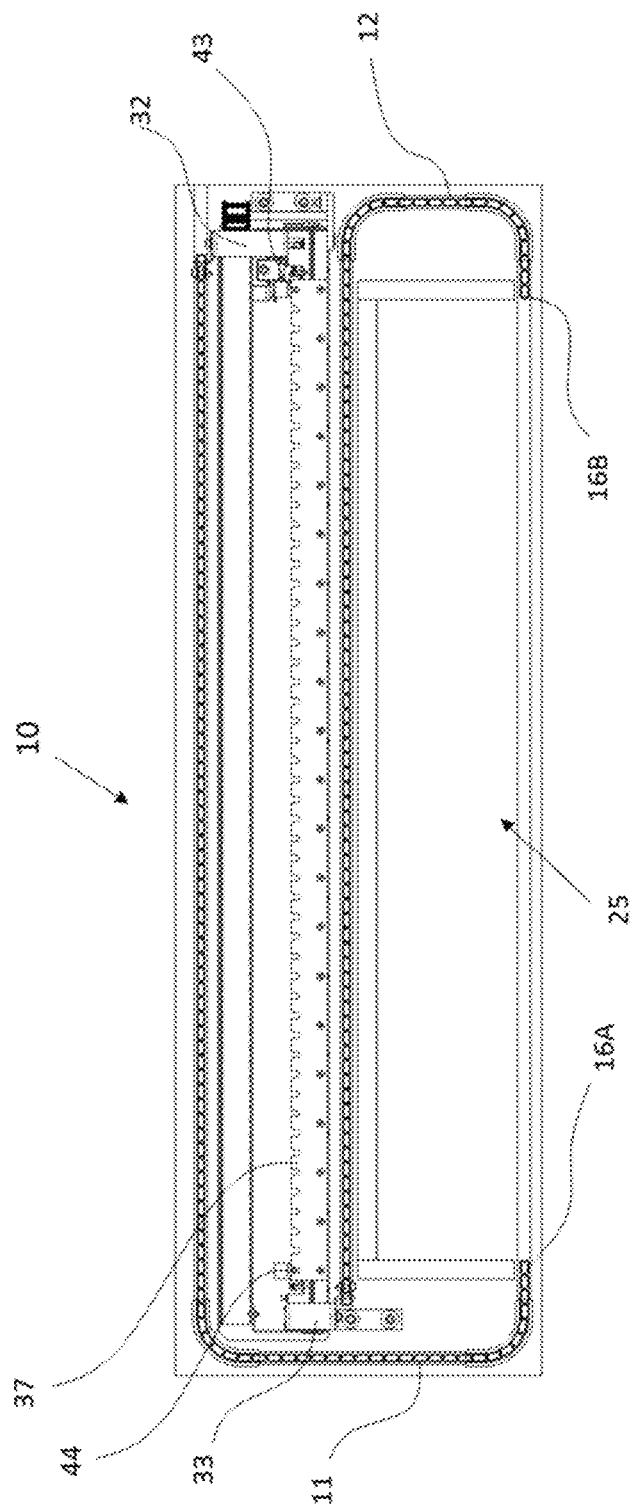
FIG. 20 is a top view of a detailed inside structure of a double deck dispensing module, according to a non-limiting embodiment.
Figure 21:
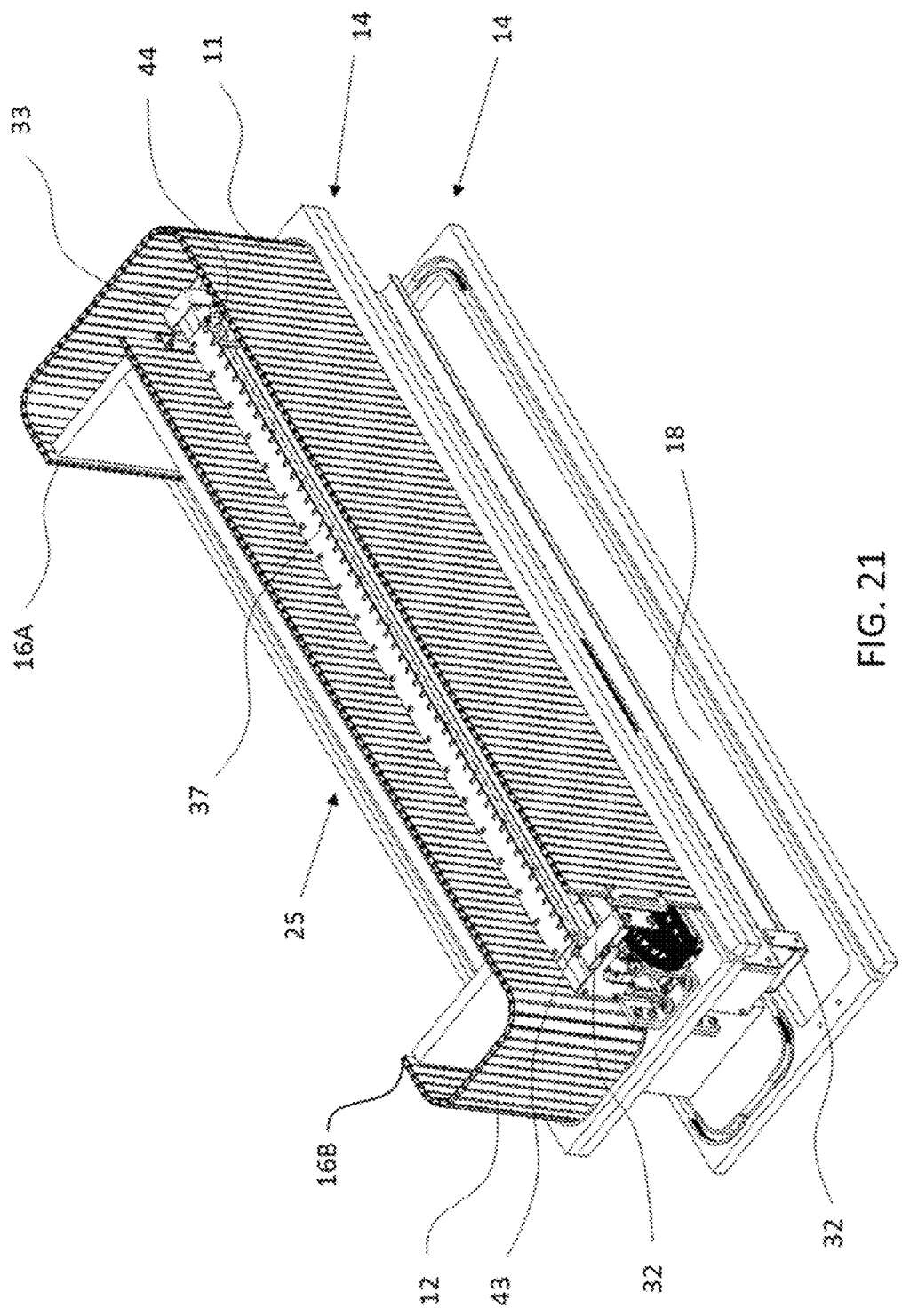
FIG. 21 is a perspective view of a detailed inside structure of a double deck dispensing module, according to a non-limiting embodiment.

FIGS. 19 to 21 illustrate the inside structure of the double deck dispensing module 10. The double deck dispensing module 10 includes the inside structure between the top plate 13 and the bottom plate 14. A linear drive 30 moves an actuator slider 40. The actuator slider 40 includes linear actuators 41 and latch grids 46. The linear actuators 41 and the latch grids 46 are associated with first pins 43 and second pins 44. The first pins 43 associate with first sliders 32 whereas the second pins 44 associate with the second sliders 33. The first sliders 32 are connected with first shutters 11 whereas the second sliders 33 are connected with second shutters 12. By movements of linear actuators 41, first pins 43 and second pins 44 may park at brake grids 37 to stop moving or engaged into latch grids 46 to move along with the actuator slider 40. To differentiate between pin movement status, symbols (o/x in circle) are used. For example, first pins 43 and second pins 44 are parked at brake grids 37.

The linear drive 30 can include location sensors 31 to set up home position of the actuator slider 40 precisely. The actuator slider 40 can freely move along with the linear drive 30 not combined with the first pins 43 and the second pins 44 during home position set up.

The linear drive 30 can include an encoder which help to control the movement of the actuator slider 40. A motor controller 38 can control the movement of a linear motor associated with the control module 3. Therefore, the control module 3 can communicate with the motor controller 38 and database management system (not shown) to actuate movement of the first shutter 11 and the second shutter 12 to a specific location.

Figure 22:
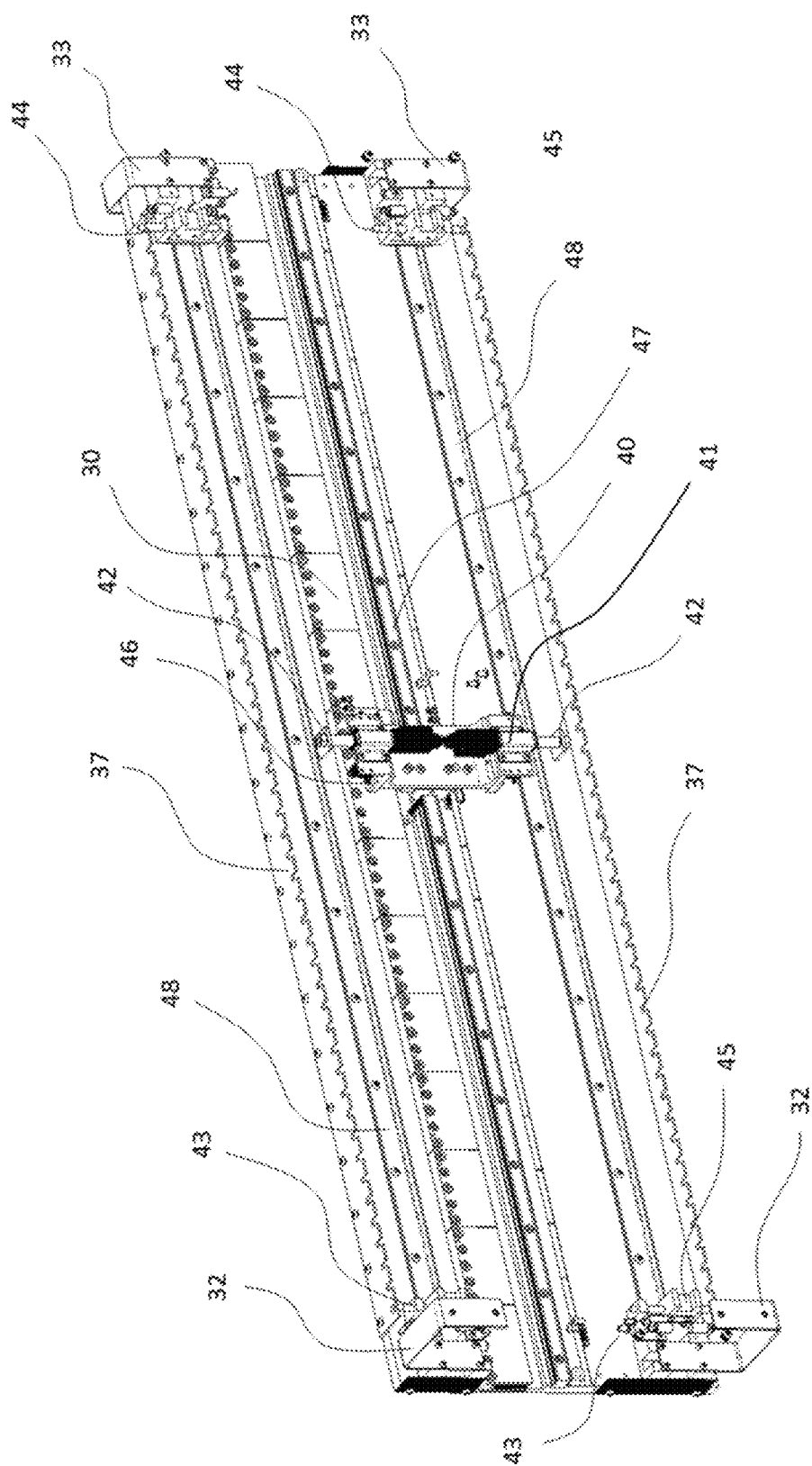
FIG. 22 is a perspective view of an inside structure of a connecting mechanism with a linear drive, according to a non-limiting embodiment.

FIG. 22 is a perspective view of an inside structure of a connecting mechanism with a linear drive 30, according to a non-limiting embodiment. To implement the double deck dispensing module 10 efficiently, the structure of the connecting mechanism includes two linear actuators 41, two first pins 43, two second pins 44 and two brake grids 37 with a linear drive 30. The configuration of the double deck dispensing module 10 can include an actuator rail 47 and two pin rails 48 and is substantially symmetrical. The linear actuators 41 have linear actuator heads 42 tapping pin steppers 45 in connection with first pins 43 and second pins 44. The linear actuators 41 can vertically control pin connections between the brake grid 37 and the latch grid 46. As the linear actuator 41 pulls down a first pin 43 or a second pin 44, the first pin 43 or the second pin 44 are released from the brake grid 37 and engaged to the latch grid 46. Consequently, the connecting mechanism controls connections between the shutters 11, 12 and the linear drive 30.

FIGS. 23 to 28 show moving steps of parts in the dispensing module 10, according to a non-limiting embodiment. An item can be delivered as a result of the moving steps of parts in the dispensing module 10. The moving steps are not limited to a double deck dispensing module 10. For simple description, the moving steps are illustrated for single deck dispensing module 10.

Figure 29B:
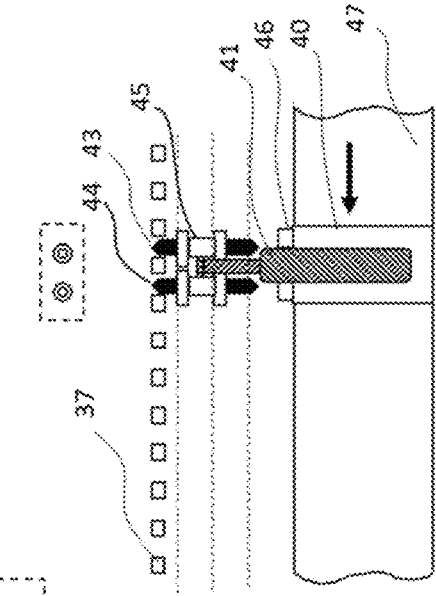
FIG. 29B is a front view of a moving step between pins, an actuator and an actuator slider moving an actuator slider to pins, according to a non-limiting embodiment.
Figure 29A:
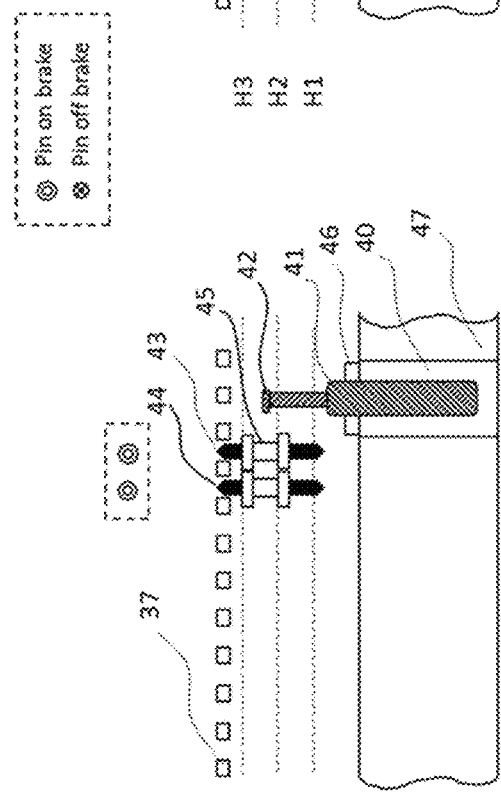
FIG. 29A is a front view of a moving step between pins, an actuator and an actuator slider at a stop position, according to a non-limiting embodiment.

FIG. 23 shows an inside structure of the dispensing module 10 at a stop position, according to a non-limiting embodiment. Shutter ends 16A, 16B meet securely at the stop position as the first pin 43 and the second pin 44 park at the brake grid 37 around location P1, P3. The actuator slider 40 remains apart from the first pin 43 and the second pin 44 (See also FIG. 29A).

Figure 29D:
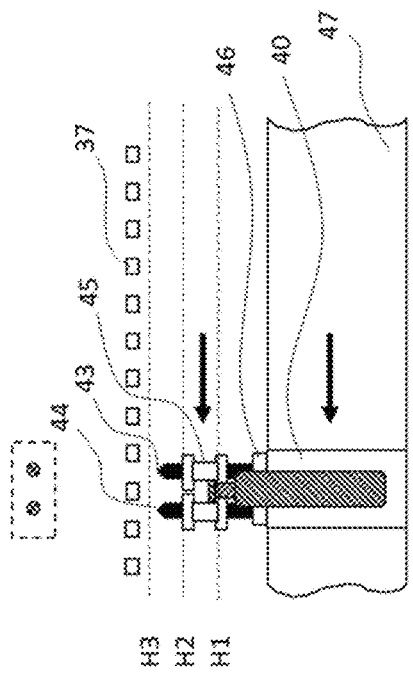
FIG. 29D is a front view of a moving step between pins, an actuator and an actuator slider moving an actuator slider with pins to a designated location, according to a non-limiting embodiment.
Figure 29C:
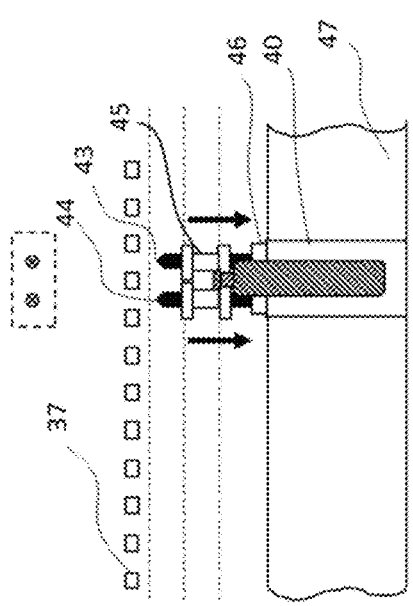
FIG. 29C is a front view of a moving step between pins, an actuator and an actuator slider moving down pins with an actuator, according to a non-limiting embodiment.
Figure 29E:
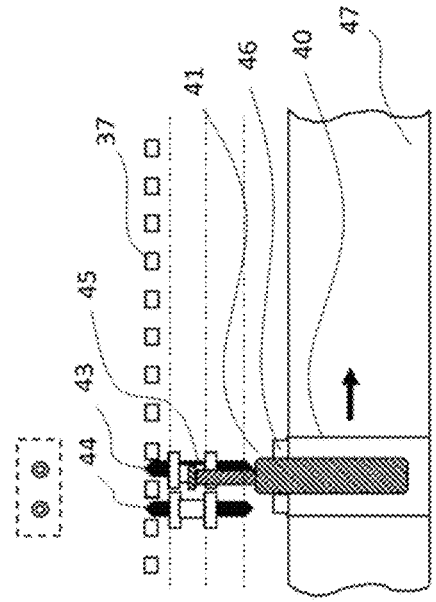
FIG. 29E is a front view of a moving step between pins, an actuator and an actuator slider moving up pins with an actuator, according to a non-limiting embodiment.
Figure 29F:
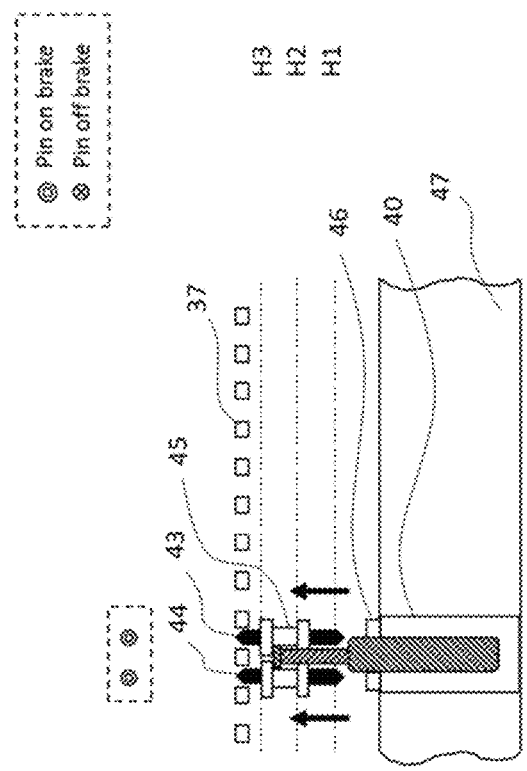
FIG. 29F is a front view of a moving step between pins, an actuator and an actuator slider moving an actuator slider to a first pin, according to a non-limiting embodiment.
Figure 29G:
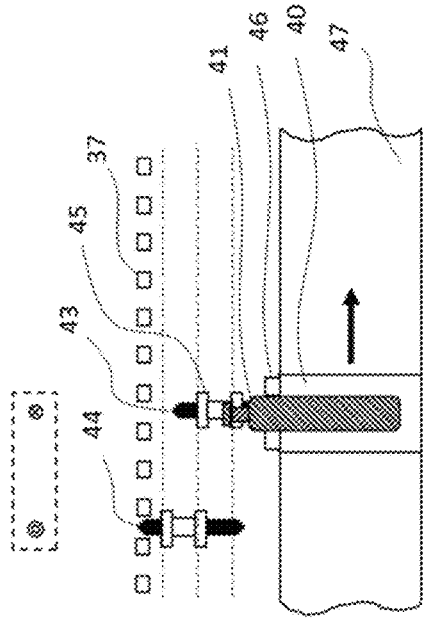
FIG. 29G is a front view of a moving step between pins, an actuator and an actuator slider moving down a first pin with an actuator, according to a non-limiting embodiment.
Figure 29H:
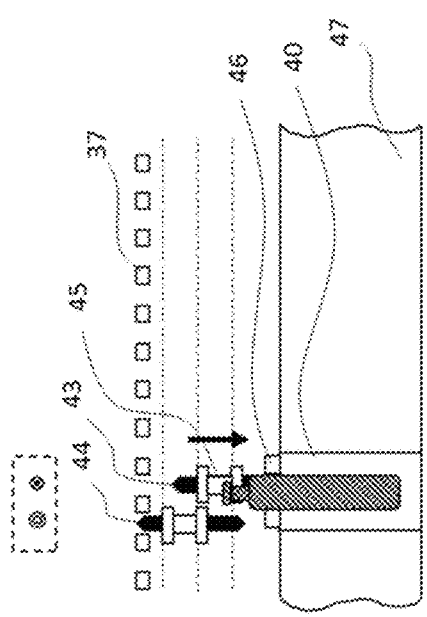
FIG. 29H is a front view of a moving step between pins, an actuator and an actuator slider moving a first pin with an actuator to a designated location, according to a non-limiting embodiment.

FIG. 24 shows an inside structure of the dispensing module 10 preparing to move both a first shutter 11 and a second shutter 12, according to a non-limiting embodiment. The linear drive 30 approaches to the first pin 43 and the second pin 44 to engage with each other (See also FIG. 29B). As the first pin 43 and the second pin 44 are released from the brake grid 37, the first pin 43 and the second pin 44 are connected to the actuator slider 40 through the latch grid 46 (See also FIG. 15, step 104 and FIG. 29C).

FIG. 25 shows an inside structure of a dispensing module 10 moving an actuator slider 40 with a first slider 32 and a second slider 33 to designated locations, according to a non-limiting embodiment.

The first shutter 11 and the second shutter 12 are connected to the first slider 32 and the second slider 33 respectively. The first slider 32 and the second slider 33 move to location P2 as combined with the actuator slider 40 through the first pin 43 and the second pin 44. The shutter ends 16A, 16B also move associated with the first shutter 11 and the second shutter 12. (See also FIG. 15, step 106 and FIG. 29D).

FIG. 26 shows an inside structure of a dispensing module 10 moving an actuator slider 40 with a first slider 32 as parking a second slider 33 to open an opening gate 19, according to a non-limiting embodiment. The second slider 33 is parked at the brake grid 37 using the second pin 44 and the first slider 32 moves to P3 location. The shutter ends 16A, 16B are apart and open an opening gate 19. A customer or an operator can pick up or stock an item through the opening gate 19. The opening gate 19 is aligned with slots 25 (See also FIG. 15, steps 108-110, FIGS. 29E-29H).

FIG. 27 shows an inside structure of a dispensing module 10 moving an actuator slider 40 with a first slider to close an opening gate 19, according to a non-limiting embodiment. The first slider 32 moves back to location P2 to close the opening gate 19 after accomplishing operations. (See also FIG. 15, steps 114 and FIGS. 29J-29K).

FIG. 28 shows an inside structure of a dispensing module 10 disconnecting an actuator slider 40 from a first slider 32 to place at a stop position, according to a non-limiting embodiment. The actuator slider 40 leases the first pin 43. Now the actuator slider 40 can move along with the linear drive 30 as the first pin 43 and the second pin 44 are parked at a stop position associated with the brake grid 37 (See also FIG. 29L).

FIGS. 29A-29L show moving steps between a first pin 43, a second pin 44, a linear actuator 41 and an actuator slider 40, according to a non-limiting embodiment. The moving steps were explained in connection with FIGS. 23-28. The first pin 43, the second pin 44 and the linear actuator 41 move vertically. The linear actuator 41 can move by three stepped height to control connections between the first pin 43, the second pin 44, the brake grid 37 and the latch grid 46. For example, high, medium and low positions can be set by the linear actuator 41. At the high position, the first pin 43 or the second pin 44 or both can be combined with the brake grid 37. At low position, the first pin 43 or the second pin 44 or both can be combined with the latch grid 46. The first pin 43 and the second pin 44 stay at either the low position or the high position. The position of the first pin 43 and the second pin 44 are sustained by support structures such as springs. At medium position, the actuator slider 40 with the linear actuator 41 can move along the actuator rail 47 not connected with the first pin 43 or the second pin 44.

FIGS. 30A-30F show adjustment steps between a first pin 43, a second pin 44, a linear actuator 41 and an actuator slider 40, according to a non-limiting embodiment. The actuator slider 40 with the first pin 43 and the second pin 44 moves to a designated location (FIG. 30A), When the first pin 43 and the second pin 44 moves up to park at the brake grid 37, the first pin 43 and the second pin 44 fail to park at the brake grid 37 because of misalignment (FIG. 30B). The first pin 43 and the second pin 44 moves down to adjust the location to park (FIG. 30C) and move to a programed distance for alignment (FIG. 30D). The first pin 43 and the second pin 44 moves up again to adjust the location to park (FIG. 30E). This sequence may be repeated until the alignment is finished based on a program. After finishing alignment, the actuator slider 40 can move along with the linear drive 30. (FIG. 30F), The scope of the claims should not be limited by the embodiments set forth in the above examples, but should be given the broadest interpretation consistent with the description as a whole.

We claim:

1. A shelving system comprising:
    at least one dispensing module comprising:
        a first shutter having a first shutter end, wherein the first shutter is inserted onto a track which guides movement of the first shutter, and wherein the first shutter is connected to a first slider which moves the first shutter along the track;
        a second shutter having a second shutter end, wherein the second shutter is inserted onto the track which guides movement of the second shutter, and wherein the second shutter is connected to a second slider which moves the second shutter along the track;
        at least one motor associated with the first shutter and the second shutter to move the first shutter and second shutter along the track;
        at least one connecting mechanism to control connection of the first shutter and the second shutter and the at least one motor; and
        at least one controller connected the at least one motor to control location of the first shutter and the second shutter; and
    at least one control module connected to the at least one dispensing module, the at least one control module including at least one user interface device, the at least one control module to communicate with the at least one dispensing module for dispensing an item;
    wherein, in response to identifying the item at least one control module, the controller is configured to:
    control the first shutter and the second shutter move to a location of the item, the first shutter and second shutter connected by a switch,
    control the switch to release the first shutter from the second shutter on arrival at the location of the item, and
    control the first shutter to move away from the second shutter creating an opening gate between the first shutter end and second shutter end at the location of the item.

2. The shelving system of claim 1 wherein the opening gate is aligned with designated slots.

3. The shelving system of claim 2 wherein the at least one dispensing module comprises at least one location sensor to make the opening gate aligned with the designated slots.

4. The shelving system of claim 1 wherein the at least one connecting mechanism comprises at least one mover to move the first shutter and the second shutter along the track, at least one stopper to limit movement of the first shutter and the second shutter along the track, and at least one switch to connect or disconnect the first shutter and the second shutter.

5. The shelving system of claim 4 wherein the at least one switch includes at least one solenoid switch.

6. The shelving system of claim 4 wherein the at least one switch includes at least one linear actuator.

7. The shelving system of claim 1 wherein the at least one dispensing module shares the at least one motor and the at least one connecting mechanism.

8. The shelving system of claim 1 wherein the at least one dispensing module comprises at least one lighting device to illuminate an item thereon.

9. The shelving system of claim 1 further comprising at least one display module including at least one information display device.

10. The shelving system of claim 1 wherein a connection of the first shutter end and second shutter end closes the opening gate.

11. The shelving system of claim 1 wherein the first shutter connected to the first slider is guided by an outer track.

12. The shelving system of claim 1 wherein the second shutter connected to the second slider is guided by an inner track.

13. The shelving system of claim 1 wherein the first shutter and the second shutter move vertically along the track.

* * * * *